(12) United States Patent
Bowen et al.

(10) Patent No.: US 11,545,307 B2
(45) Date of Patent: Jan. 3, 2023

(54) FABRICATION OF CAPACITORS AND RECOVERY OF CAPACITOR FABRICATION MATERTIALS

(71) Applicant: Pacesetter, Inc., Sylmar, CA (US)

(72) Inventors: David Bowen, Taylors, SC (US); Ralph Jason Hemphill, Sunset, SC (US)

(73) Assignee: Pacesetter, Inc., Sylmar, CA (US)

( * ) Notice: Subject to any disclaimer, the term of this patent is extended or adjusted under 35 U.S.C. 154(b) by 160 days.

(21) Appl. No.: 16/785,594

(22) Filed: Feb. 8, 2020

(65) Prior Publication Data

US 2020/0258692 A1 Aug. 13, 2020

Related U.S. Application Data

(60) Provisional application No. 62/804,060, filed on Feb. 11, 2019, provisional application No. 62/804,055, filed on Feb. 11, 2019.

(51) Int. Cl.
*H01G 9/048* (2006.01)
*H01G 9/055* (2006.01)
*H01G 9/045* (2006.01)
*H01G 9/042* (2006.01)
*H01G 9/00* (2006.01)

(52) U.S. Cl.
CPC ........... *H01G 9/048* (2013.01); *H01G 9/0029* (2013.01); *H01G 9/045* (2013.01); *H01G 9/0425* (2013.01); *H01G 9/055* (2013.01)

(58) Field of Classification Search
CPC .............................. H01G 9/048; H01G 9/055
See application file for complete search history.

(56) References Cited

U.S. PATENT DOCUMENTS

| 5,922,215 | A | * | 7/1999 | Pless | H01G 9/0029 216/6 |
| 7,443,652 | B2 | * | 10/2008 | Sherwood | H01G 9/008 361/508 |
| 2006/0012942 | A1 | * | 1/2006 | Poplett | H01G 9/10 361/301.4 |
| 2006/0107506 | A1 | * | 5/2006 | Doffing | H01G 9/14 29/25.03 |

* cited by examiner

*Primary Examiner* — David M Sinclair

(57) ABSTRACT

A capacitor is fabricated by generating a sheet of material that has a first active region that includes tunnels extending into an electrode metal. The sheet of material has a first inactive region that includes the electrode metal but does not include the tunnels extending into the electrode metal. The first inactive region has a first shape that includes multiple first projections that each projects from a perimeter of a circle. An electrode is removed from the sheet of material such that the electrode includes a portion of the inactive region. Additionally or alternately, fabricating a capacitor include using a first etching solution to etch a first sheet of material so as to generate a spent etchant. At least one chemical component is recovered from the spent etchant. A second etching solution is used to etch a second sheet of material. The second etchant includes at least one of the chemical components that was recovered from the spent etchant.

14 Claims, 12 Drawing Sheets

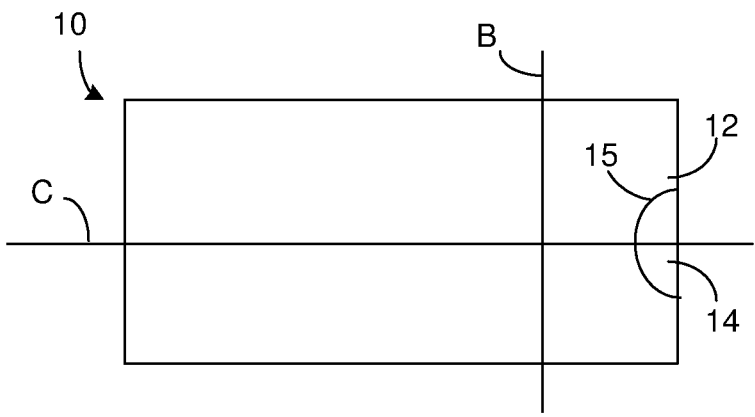
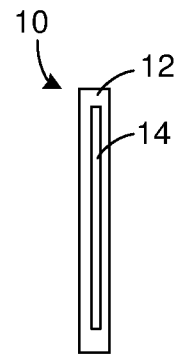
Figure 1A　　　　　Figure 1B
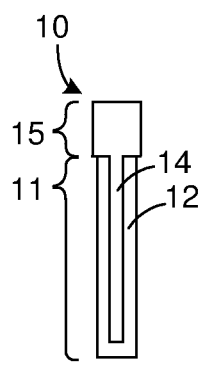
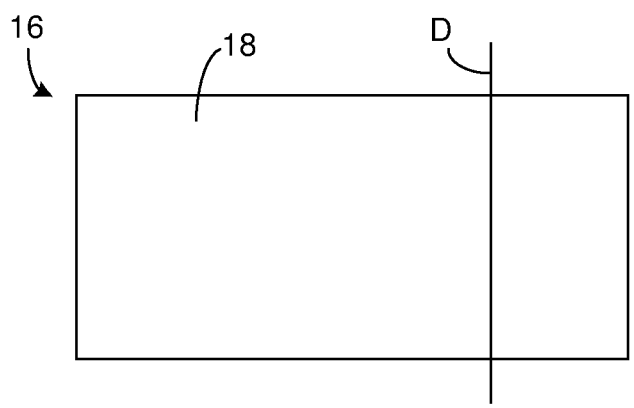
Figure 1C　　　　　Figure 1D
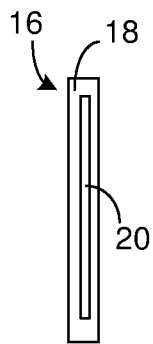
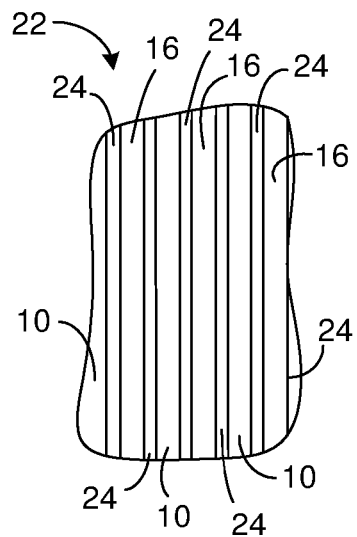
Figure 1E　　　　　Figure 1F

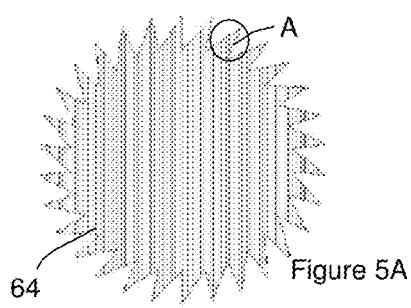
Figure 5A
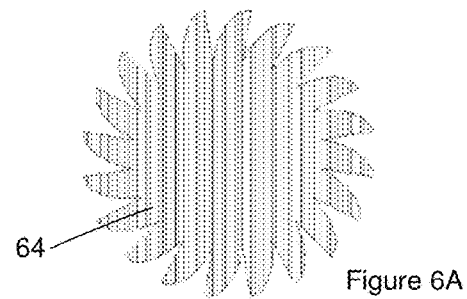
Figure 6A
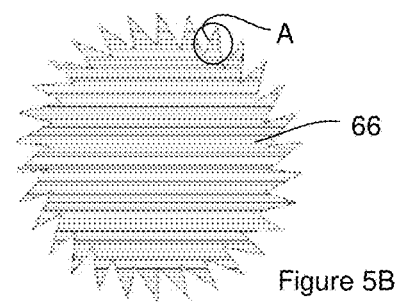
Figure 5B
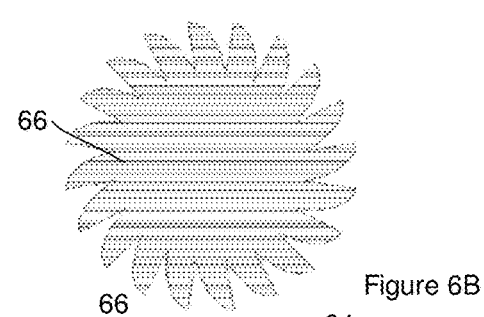
Figure 6B
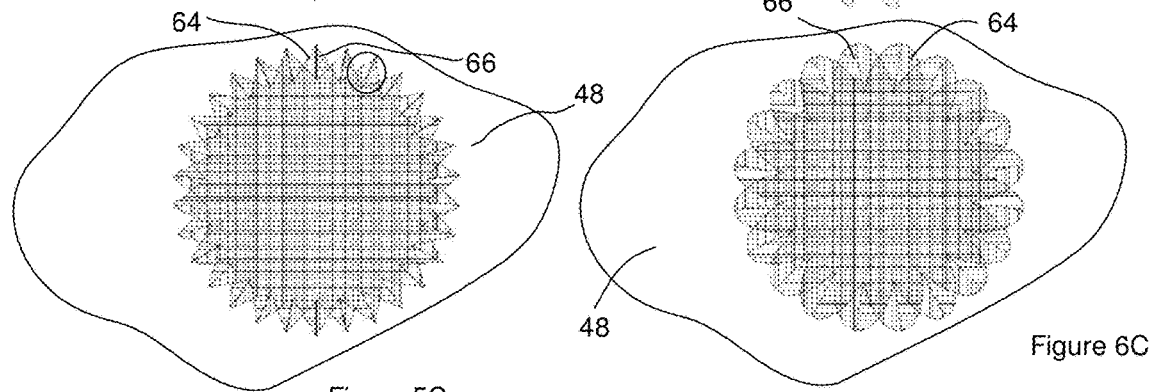
Figure 5C
Figure 6C
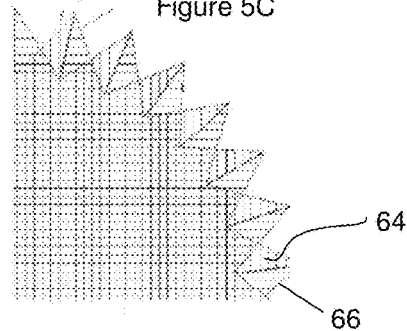
Figure 5D
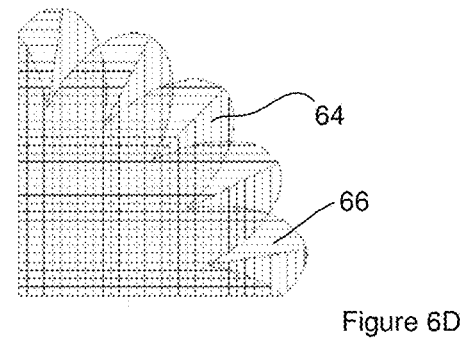
Figure 6D

FABRICATION OF CAPACITORS AND RECOVERY OF CAPACITOR FABRICATION MATERTIALS

RELATED APPLICATIONS

This application claims the benefit of U.S. Patent application Ser. No. 62/804,055, filed on Feb. 11, 2019, and incorporated herein in its entirety and also claims the benefit of U.S. Patent application Ser. No. 62/804,060, filed on Feb. 11, 2019, and incorporated herein in its entirety.

FIELD

The invention relates to electrochemical devices. In particular, the invention relates to capacitors.

BACKGROUND

Electrodes for capacitors are often fabricated by etching tunnels in a sheet of material that includes an anode metal. An oxide of the anode metal is then formed on the exposed anode metal. In order to prevent clogging of the tunnels by the oxide, the tunnels are generally widened before the oxide is formed in the tunnels. After the formation of the oxide, the sheet of material generally becomes brittle. The electrode is removed from the sheet of material using mechanical cutting techniques or other cutting techniques such as laser cutting.

During fabrication of the capacitor, one or more electrical conductors are generally connected to the electrode in order to provide electrical communication between the electrode and a terminal of the capacitor. Welding is often used to make this connection, however, welding is hampered by the composite nature of the electrode. In order to overcome this problem, the welded region of the electrode is masked during the etching of the tunnels and during the formation of the oxide. This masking prevents the tunnels from being formed under the mask. As a result, the final electrode includes an inactive region where the sheet of material excludes the tunnels. In some instances, the inactive region also excludes the oxide. An electrical conductor is then connected to the inactive region of the electrode.

While masking the welded region solves the problem of welding the electrode, it has the unwanted side effect of contributing to mechanical waviness across the surface of the electrode formation of the oxide. The waviness can be caused by etching and/or oxide formation reducing the size of the unmasked portion of the electrode and producing a strain in regions of the electrode where an etched region is interfaced with an inactive region. As a result, there is a need for improved capacitor electrode construction.

Additionally, etching the tunnels in the anode of a capacitor can be done with processes such as electrochemical etching or electrochemical drilling. In electrochemical etching and/or electrochemical drilling, a sheet of a material is at least partially immersed in a bath of etching solution. In some instances, the etching solution includes one or more acids and sodium perchlorate.

The etching process leaves material from the sheet of material dissolved in spent etching solution. For instance, when the sheet of material is aluminum, the etching process results dissolved aluminum being present in the spent etching solution. However, high levels of dissolved aluminum causes tunnel initiation to drop and the pH of the bath to increase. As a result, fresh etching solution is added to the etch bath to control pH and aluminum concentration. The spent etching solution cannot be discharged to POTW (Publicly Owned Treatment Work) and accordingly requires costly waste disposal. Additionally, sodium perchlorate is expensive and, highly stable thermally, and does not break down quickly in the environment. As a result, there is a need to recover spent one or more compounds from spent etching solution.

SUMMARY

A capacitor includes an electrode with a first active region that includes tunnels extending into an electrode metal. The electrode also has a first inactive region that includes the electrode metal but does not include the tunnels extending into the electrode metal. The first inactive region has a first shape that includes multiple first projections that each projects from a perimeter of a first semicircle.

In some instances, the electrode has a second inactive region that includes the electrode metal but does not include the tunnels extending into the electrode metal. The second inactive region has a second shape that includes multiple second projections that each projects from a perimeter of a second semicircle. A first side of the electrode is opposite from a second side of the electrode. The first active region and the first inactive region are on the first side of the electrode and the second active region and the second inactive region are on the second side of the electrode. The first semicircle can be aligned with the second semicircle in that a first line can extend through the center of the first semicircle and also through the center of the second semicircle with the first line being parallel to a second line that is perpendicular to the first side of the sheet of material.

A capacitor electrode precursor includes a sheet of material that has a first active region that includes tunnels extending into an electrode metal. The sheet of material also has a first inactive region that includes the electrode metal but does not include the tunnels extending into the electrode metal. The first inactive region has a first shape that includes multiple first projections that each projects from a perimeter of a first circle.

In some instances, the sheet of material includes a second active region that includes tunnels extending into the electrode metal. The sheet of material also has a second inactive region that includes the electrode metal but does not include the tunnels extending into the electrode metal. The second inactive region has a second shape that includes multiple second projections that each projects from a perimeter of a second circle. The first side of the sheet of material is opposite from the second side of the sheet of material. The first active region and the first inactive region are on the first side of the sheet of material and the second active region and the second inactive region are on the second side of the sheet of material. The first circle can be aligned with the second circle in that a first line can extend through the center of the first circle and also through the center of the second circle with the first line being parallel to a second line that is perpendicular to the first side of the sheet of material.

In some instances, a capacitor is fabricated by generating a sheet of material that has a first active region that includes tunnels extending into an electrode metal. The sheet of material has a first inactive region that includes the electrode metal but does not include the tunnels extending into the electrode metal. The first inactive region has a first shape that includes multiple first projections that each projects from a perimeter of a circle. An electrode is removed from the sheet of material such that the electrode includes a portion of the inactive region that has one or more of the projections that each extends from a semicircle. The semicircle is a portion of the circle.

In one embodiment, fabricating a capacitor includes using a first etching solution to etch a first sheet of material so as to generate a spent etchant. At least one chemical component is recovered from the spent etchant. A second etching solution is sued to etch a second sheet of material. The second etchant includes at least one of the chemical components that was recovered from the spent etchant.

Recovering one or more chemical components from an etching solution used in capacitor fabrication includes exposing a sheet of material to an etching solution so as to generate a spent etching solution that includes metal ions from the sheet of material. The method also includes adding a precipitant to the spent etching solution so as to cause precipitation of a compound in a precipitation solution. The compound includes the metal ions from the sheet of material. Additionally, the precipitant is disassociated in the precipitation solution such that the precipitation solution includes cations from the precipitant. The method also includes removing from the precipitation solution at least a portion of the cations from the precipitant.

BRIEF DESCRIPTION OF THE FIGURES

FIG. 1A through FIG. 1H illustrate the construction of a capacitor. FIG. 1A is a sideview of an anode that is suitable for use in the capacitor.

FIG. 1B is a cross-section of the anode shown in FIG. 1A taken along the line labeled B in FIG. 1A.

FIG. 1C is a cross-section of the anode shown in FIG. 1A taken along the line labeled C in FIG. 1A.

FIG. 1D is a sideview of a cathode that is suitable for use in the capacitor.

FIG. 1E is a cross-section of the cathode shown in FIG. 1D taken along the line labeled D in FIG. 1D.

FIG. 1F is a cross section of an electrode assembly where anodes are alternated with cathodes. The anodes and cathodes can be constructed according to FIG. 1A through FIG. 1E.

FIG. 1G is a schematic diagram of a capacitor that includes the electrode assembly of FIG. 1F positioned in a capacitor case.

FIG. 1H is a sideview of an interface between an anode and a cathode that are adjacent to one another in the capacitor of FIG. 1G.

FIG. 2A is a topview of a sheet of material from which the anode is constructed. The sheet of material can be a sheet of an anode metal.

FIG. 2B is a portion of a cross section of the sheet of material showing an interface between the side of the sheet of material and the atmosphere in which the sheet of material is positioned.

FIG. 2C illustrates the sheet of material of FIG. 2B after the formation of preliminary channels in the sheet of material.

FIG. 2D illustrates the sheet of material of FIG. 2C after widening the preliminary channels.

FIG. 2E illustrates the sheet of material of FIG. 2C after formation of an anode metal oxide on the exposed surfaces of an anode metal.

FIG. 2F illustrates an example of a compression mechanism for performing a thermal compression operation on the sheet of material.

FIG. 2G illustrate an anode extracted from the sheet of material shown in FIG. 2F.

FIG. 2H illustrates a capacitor that includes the anode of FIG. 2G.

FIG. 4A is a topview of the first mask.

FIG. 4B is a bottomview of the second mask.

FIG. 4C is a topview of the portion of the sheet of material that includes the first mask aligned with the second mask. In FIG. 4C, the first mask and the sheet of material are treated as transparent. As a result, the features underlying the first mask are evident in FIG. 4C.

FIG. 4D is a magnified view of an edge of the first mask and the second mask arranged as shown in FIG. 4C.

FIG. 5A through FIG. 5D illustrate a first mask and a second mask suitable for use with a sheet of material from which an electrode is constructed. FIG. 5A is a topview of the first mask.

FIG. 5B is a bottomview of the second mask.

FIG. 5C is a topview of the portion of the sheet of material that includes the first mask aligned with the second mask. In FIG. 5C, the first mask and the sheet of material are treated as transparent. As a result, the features underlying the first mask are evident in FIG. 5C.

FIG. 5D is a magnified view of an edge of the first mask and the second mask arranged as shown in FIG. 5C.

FIG. 6A through FIG. 6D illustrate a first mask and a second mask suitable for use with a sheet of material from which an electrode is constructed. FIG. 6A is a topview of the first mask.

FIG. 6B is a bottomview of the second mask.

FIG. 6C is a topview of the portion of the sheet of material that includes the first mask aligned with the second mask. In FIG. 6C, the first mask and the sheet of material are treated as transparent. As a result, the features underlying the first mask are evident in FIG. 6C.

FIG. 6D is a magnified view of an edge of the first mask and the second mask arranged as shown in FIG. 6C.

DESCRIPTION

Figure 1G:
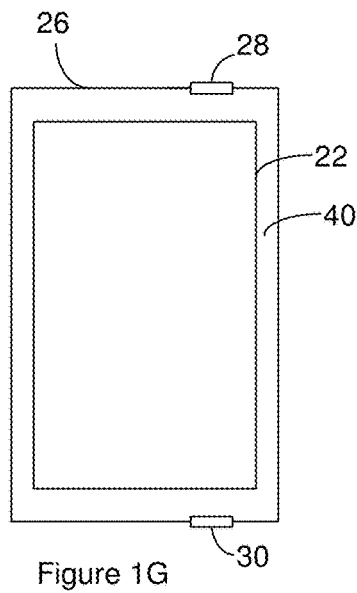

A sheet of material is fabricated to include inactive regions that each has multiple projections extending from a perimeter of an imaginary circle. The inactive regions are concentrically positioned on opposing sides of the sheet of material but are rotated relative to one another. A capacitor electrode is removed from the sheet of material such that a path along which the electrode is removed from the sheet of material extends across the inactive regions. As a result, a fraction of each inactive region on the sheet of material becomes an inactive region on the resulting electrode. Electrical conductors can be connected to the inactive regions through techniques such as welding. The presence of the projections on the inactive regions combined with the inactive regions being rotated relative to one another on opposing sides of the sheet of material reduces strain near the interface between the inactive regions and the active regions of the electrode. Accordingly, the configuration of the inactive regions on the electrode reduces the waviness and warping of the electrode.

The active regions in the sheet of material can be formed by exposing the active regions to an etching solution. The etching solution creates tunnels or channels in the active regions on the sheet of material. Creating these tunnels causes metal ions from the sheet of material to be present in the spent etching solution. One or more chemical components that were present in the etching solution can be recovered by adding a precipitant to the spent etching solution so as to form a precipitation solution with a precipitate and a supernate. The precipitate includes a compound that includes the metal ions and the supernate includes cations that are disassociated from the precipitant. The cations from the precipitant can be removed from the supernate and the result can serve as a recovery solution. One or more adjustment solutions can then be added to the recovery solution so as to return at least a portion of the chemical components to concentration levels within initial specifications for the etching solution. The adjusted solution can then serve as a recovered etchant that can be mixed with fresh etching solution or can be used in place of fresh etching solution.

This approach to recovering chemical components from an etching solution has consistently yielded a recovered etchant where at least 30 wt % of each at least a portion the chemical components (one or more acids, one or more oxidizers, and one or more surfactants) that were originally present in the etching solution are present in the recovered etchant and/or in the recovery solution. Accordingly, the recovery technique can have a recovery rate that is greater than 30 wt % for all or a portion of the chemical components in the etching solution. Additionally, using the recovered etchant to generate anodes for a capacitor has yielded anode with the same capacitance levels as unused etching solution. Further, an etching solutions that include sodium perchlorate in the acid etch solution at 3 to 4 w/w % can be used to create an anode with a capacitance above 1.25 microF/cm$^2$ at 490 Volts allowing a capacitor with an energy density above 5.5 J/cc and volume below 8 cc to be achieved. The inventors have not been able to re-create these performance levels without the use of sodium perchlorate. The ability to use the above method to recover the sodium perchlorate greatly reduces the costs of fabrication such a capacitor and can make commercialization practical.

FIG. 1A through FIG. 1H illustrate the construction of a capacitor. FIG. 1A is a sideview of an anode 10 that is suitable for use in a capacitor. FIG. 1B is a cross-section of the anode 10 shown in FIG. 1A taken along the line labeled B in FIG. 1A. FIG. 1C is a cross-section of the anode 10 shown in FIG. 1A taken along the line labeled C in FIG. 1A.

The anode 10 includes an active region 11 that includes, consists of, or consists essentially of a layer of anode metal oxide 12 over a layer of an anode metal 14. Suitable anode metals 14 include, but are not limited to, aluminum, tantalum, magnesium, titanium, niobium, and zirconium. As illustrated in FIG. 1B, in some instances, the anode metal oxide 12 surrounds the anode metal 14 in that the anode metal oxide 12 is positioned on both the edges and the faces of the anode metal 14. Many anode metal oxides 12 can exist in more than one phase within the same material state (solid, liquid, gas, plasma). For instance, an anode metal oxide 12 such as aluminum oxide can be in a boehmite phase (AlO(OH)) that is a solid or in alpha phase corundum oxide phase ($\alpha$-Al$_2$O$_3$) that is also a solid.

The anode 10 also includes an inactive region 15 that includes, consists of, or consists essentially of the layer of anode metal 14 and may or may not exclude the anode metal oxides 12. The inactive region is present on a first side and one a second side of the anode. The shape of the inactive region 15 is not shown in detail in FIG. 1A. As will be described in detail below, the shape of the inactive region is selected to reduce waviness of the anode. In some instance, the anode metal oxide 12 is formed on the anode metal by converting a portion of the anode metal to the anode metal oxide 12 through oxidation of the anode metal oxide 12. In these instances, the active region of the anode may be thinner than the inactive region of the anode as is evident in FIG. 1C.

FIG. 1D is a sideview of a cathode 16 that is suitable for use in the capacitor. FIG. 1E is a cross-section of the cathode 16 shown in FIG. 1D taken along the line labeled D in FIG. 1D. The cathode 16 includes a layer of cathode metal oxide 18 over a layer of a cathode metal 20. Suitable cathode metals 20 include, but are not limited to, aluminum, titanium, stainless steel. Although not illustrated, the cathode metal can be layer of material on a substrate. For instance, the cathode metal can be a titanium or titanium nitride coating on a substrate such as a metal and/or electrically conducting substrate. Examples of suitable substrates include, but are not limited to, aluminum, titanium, and stainless steel substrates. The cathode metal oxide 18 can be formed on the cathode metal 20 by oxidizing the cathode metal 20 in air. The cathode metal 20 can be the same as the anode metal 14 or different from the anode metal 14. In some instances, the cathode metal 20 and the anode metal 14 are both aluminum. As illustrated in FIG. 1E, in some instances, the cathode metal oxide 18 surrounds the cathode metal 20. For instance, the cathode metal oxide 18 is positioned over the edges and faces of the cathode metal 20. Although not illustrated in FIG. 1D and FIG. 1E, the cathode can include an inactive region where the cathode metal 20 is exposed. One or more electrical conductors can be connected to the exposed cathode metal using techniques such as welding. The electrical conductors can provide electrical communication between the cathode and a terminal of the capacitor.

The anodes 10 and cathodes 16 are generally arranged in an electrode assembly 22 where one or more anodes 10 are alternated with one or more cathodes 16. For instance, FIG. 1F is a cross section of an electrode assembly 22 where anodes 10 are alternated with cathodes 16. The anodes 10 and cathodes 16 can be constructed according to FIG. 1A through FIG. 1E. A separator 24 is positioned between anodes 10 and cathodes 16 that are adjacent to one another in the electrode assembly 22. The electrode assembly 22 typically includes the anodes 10 and cathodes 16 arranged in a stack or in a jelly roll configuration. Accordingly, the cross section of FIG. 1F can be a cross section of an electrode assembly 22 having multiple anodes 10 and multiple cathodes 16 arranged in a stack. Alternately, the cross section of FIG. 1F can be created by winding one or more anodes 10 together with one or more cathodes 16 in a jelly roll configuration. However, as the anodes become more brittle due to increased surface area, it may not be practical or possible to form a jelly-roll configuration. Suitable separators 24 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

The electrode assembly 22 is included in a capacitor. For instance, FIG. 1G is a schematic diagram of a capacitor that includes the electrode assembly 22 of FIG. 1F positioned in a capacitor case 26. Although not illustrated, the one or more anodes in the electrode assembly 22 are in electrical communication with a first terminal 28 that can be accessed from outside of the capacitor case 26. The one or more cathodes 16 in the electrical assembly are in electrical communication with a second terminal 30 that can be accessed from outside of the capacitor case 26. In some instances, the one or more anodes include or are connected to electrical conductors such as tabs (not shown) that provide electrical communication between the one or more anodes and the first terminal 28 and the one or more cathodes 16 include or are connected to electrical conductors such as tabs (not shown) that provide electrical communication between the one or more cathodes 16 and the second terminal 30. The capacitor can include one or more electrical insulators (not shown) positioned as needed to prevent shorts-circuits within the capacitor.

Figure 1H:
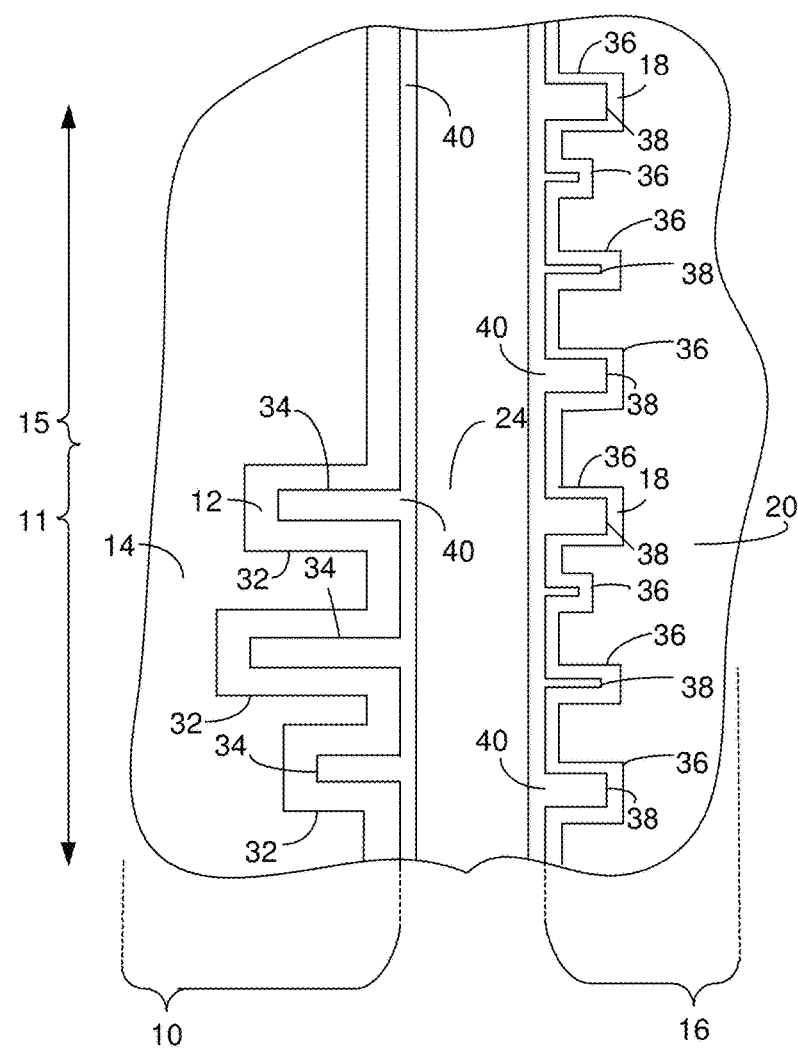

FIG. 1H is a sideview of an interface between an anode 10 and a cathode 16 that are adjacent to one another in the capacitor of FIG. 1G. The illustration in FIG. 1H is magnified so it shows features of the anode 10 and cathode 16 that are not shown in FIG. 1A through FIG. 1F. In the active region of the anode, the face of the anode 10 includes channels 32 that extend into the anode metal 14 so as to increase the surface area of the anode metal 14. Although the channels 32 are shown extending part way into the anode metal, all or a portion of the channels 32 can extend through the anode metal. Suitable channels 32 include, but are not limited to, pores, trenches, tunnels, recesses, and openings. In some instances, the channels 32 are configured such that the anode has a number of channels/area greater than or equal to 30 million tunnels/cm$^2$. Increasing the number of channels has been shown to increase the brittleness of the anodes and/the sheet of material from which the anodes are extracted. Accordingly, increasing the surface area of the anode can result in a more brittle anode or sheet of material. In the active region 11 of the anode, the anode metal oxide 12 is positioned on the surface of the anode metal 14 and is positioned in the channels 32. The anode metal oxide 12 can fill the channels 32 and/or anode oxide channels 34 can extend into the anode metal oxide 12. However, it is generally not desirable for the anode metal oxide 12 to fill the channels 32 because filling the channels 32 can lead to reduced capacitance and electrical porosity.

The inactive region 15 of the anode includes the anode metal 14. However, in the inactive region 15 of the anode, the anode excludes one, two, or three components selected from the group consisting of the anode metal oxide 12, the channels 32 and the anode oxide channels 34. In the illustration of FIG. 1H, the inactive region of the anode excludes the channels 32 and the anode oxide channels 34. Although an electrical conductor such as a tab can be attached to one or both sides of the anode, the electrical conductor is not shown in FIG. 1H in order to better illustrate the interface construction.

In FIG. 1H, an active region of a cathode is shown interfaced with an inactive region of the anode; however, an inactive region of the cathode can be interfaced with the inactive region of the anode. The surface of the cathode 16 optionally includes cathode channels 36 that extend into the anode metal 14 so as to increase the surface area of the anode metal 14. Suitable cathode channels 36 include, but are not limited to, pores, trenches, tunnels, recesses, and openings. The cathode metal oxide 18 can be positioned on the surface of the cathode metal 20. When the cathode metal 20 includes cathode channels 36, the cathode metal oxide 18 can be positioned in the cathode channels 36. The cathode metal oxide 18 can fill the cathode channels 36 and/or cathode oxide channels 38 can extend into the cathode metal oxide 18.

An electrolyte 40 is in contact with the separator 24, the anode 10 and the cathode 16. The electrolyte 40 can be positioned in the cathode oxide channels 38. When the cathode metal 20 includes cathode oxide channels 38, the electrolyte 40 can be positioned in the cathode oxide channels 38. The electrolyte 40 can be a liquid, solid, gel or other medium and can be absorbed in the separator 24. The electrolyte 40 can include one or more salts dissolved in one or more solvents. For instance, the electrolyte 40 can be a mixture of a weak acid and a salt of a weak acid, preferably a salt of the weak acid employed, in a polyhydroxy alcohol solvent. The electrolytic or ion-producing component of the electrolyte 40 is the salt that is dissolved in the solvent.

A capacitor constructed according to FIG. 1A through FIG. 1H can be an electrolytic capacitor such as an aluminum electrolytic capacitor, a tantalum electrolytic capacitor or a niobium electrolytic capacitor. An electrolytic capacitor is generally a polarized capacitor where the anode metal oxide 12 serves as the dielectric and the electrolyte 40 effectively operates as the cathode 16.

Figure 2A:
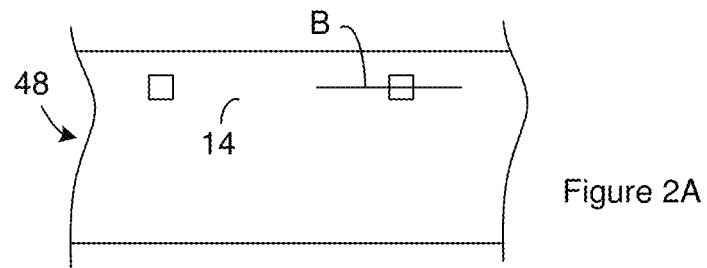
FIG. 2A through FIG. 2H illustrate a method of generating an anode for use in a capacitor constructed according to FIG. 1A through FIG. 1H.

FIG. 2A through FIG. 2H illustrate a method of generating an anode for use in a capacitor constructed according to FIG. 1A through FIG. 1H. A sheet of material 48 can acquired either by fabrication or purchase from a supplier. As will be evident below, one or more anodes are constructed from the sheet of material 48. FIG. 2A is a topview of the sheet and shows a face of the sheet positioned between edges. One or more masks 49 are positioned on the sheet of material 48 so as to protect the region of the sheet of material 48 where an inactive region of an anode will be positioned while leaving exposed the region(s) of the sheet of material 48 where an inactive region of an anode will be positioned. As will be discussed in more detail below, the masks 49 can be positioned on opposing sides of the sheet of material 48 and aligned with one another. Suitable masks 49 include, but are not limited to, inks, polymer coatings such as ink-jet applied curable polymers, photoresists and hard masks such as oxides.

Figure 2B:
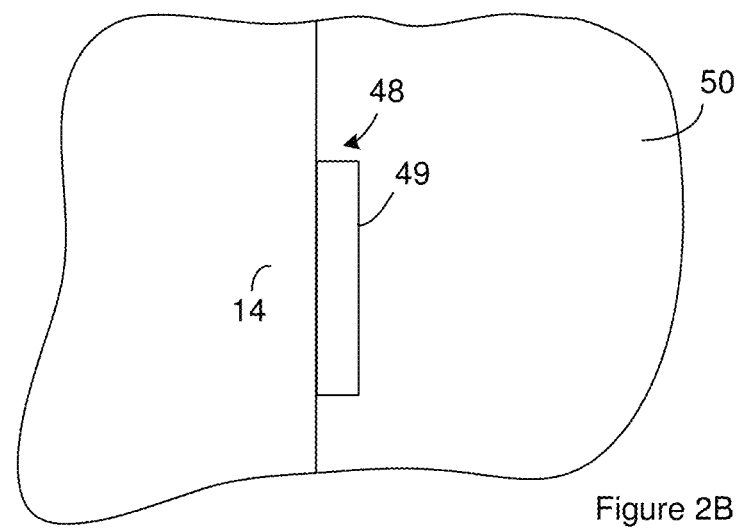
Figure 2C:
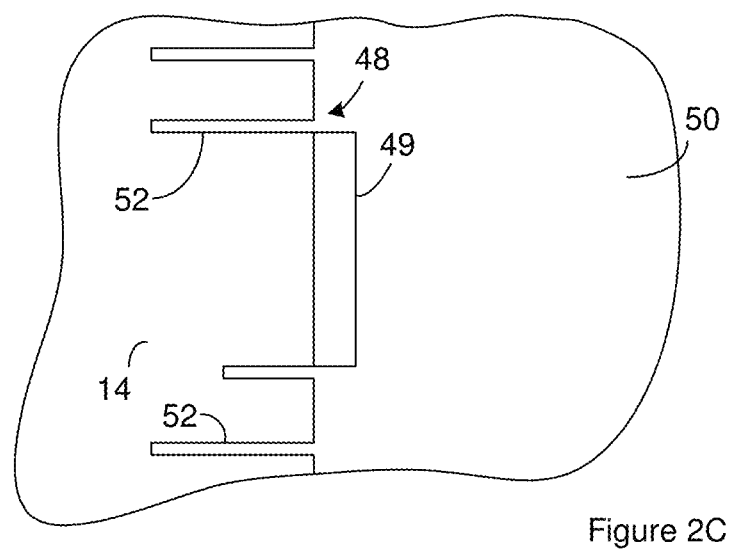

FIG. 2B is a portion of a cross section of the sheet showing an interface between the face of the sheet of material 48 and the atmosphere 50 in which the sheet is positioned. The cross section is taken through the line labeled B in FIG. 2A. Accordingly, one of the masks 49 is shown on the side of the sheet illustrated in FIG. 1B. The sheet of material 48 can include, consist of, or consist essentially of the anode metal 14.

A surface area enhancement phase can be performed so as to increase the surface area of the exposed portions of the sheet of material 48. For instance, preliminary channels 52 can be formed in the sheet of material 48 so as to provide the sheet of material 48 with the cross section of FIG. 2C. As is evident from FIG. 2C, the mask 49 protects the underlying sheet of material 48 from the formation of the preliminary channels 52. Suitable methods of forming the preliminary channels 52 include, but are not limited to, laser removal and/or drilling, etching such as chemical etching and electrochemical etching. In one example, the etching is electrochemical etching or electrochemical drilling. In electrochemical etching and/or electrochemical drilling, the sheet of material 48 is at least partially immersed in a bath that includes, consists of, or consists essentially of an etching solution such as an electrochemical drilling (ECD) solution initially having a pH of less than 5 or even less than one while passing an electrical current through the sheet of material 48. Additional examples of suitable methods for forming the preliminary channels 52 and/or additional details of suitable methods of electrochemical etching and/or electrochemical drilling can be found in U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

In some instances, the surface area enhancement phase also includes widening of the preliminary channels 52. Widening of the preliminary channels can reduce or stop the anode metal oxide 12 from filling the channels 32. For instance, the distance across the preliminary channels 52 on the sheet of FIG. 2C can be increased to provide a sheet of material 48 having the channels 32 shown in the cross section of FIG. 2D. In some instances, the preliminary channels 52 are formed and widened so as to remove more than 52% or 60% of the sheet of material 48 from the sheet of material 48 and/or to create more than 30 million channels/cm$^2$ of the sheet of material 48.

Suitable methods for widening the preliminary channels 52 include, but are not limited to, chemical and electrochemical processes. In one example of the widening process, widening of the preliminary channels 52 includes immersing at least a portion of the sheet of material 48 in an electrolyte solution that includes, consists of, or consists essentially of a chloride or nitrate. Additional examples of suitable methods for widening of the preliminary channels 52 and/or additional details about the above methods of widening preliminary channels 52 can be found in U.S. Patent application Ser. No. 05/227,951, filed on Feb. 22, 1972, granted U.S. Pat. No. 3,779,877, and entitled "Electrolytic Etching of Aluminum Foil;" U.S. Patent application Ser. No. 06/631,667, filed on Jul. 16, 1984, granted U.S. Pat. No. 4,525,249, and entitled "Two Step Electro Chemical and Chemical Etch Process for High Volt Aluminum Anode Foil;" U.S. patent application Ser. No. 11/972,792, filed on Jan. 11, 2008, granted U.S. Pat. No. 8,535,527, and entitled "Electrochemical Drilling System and Process for Improving Electrical Porosity of Etched Anode Foil;" U.S. patent application Ser. No. 10/289,580, filed on Nov. 6, 2002, granted U.S. Pat. No. 6,858,126, and entitled "High Capacitance Anode and System and Method for Making Same;" and U.S. patent application Ser. No. 10/199,846, filed on Jul. 18, 2002, granted U.S. Pat. No. 6,802,954, and entitled "Creation of Porous Anode Foil by Means of an Electrochemical Drilling Process;" each of which is incorporated herein in its entirety.

Figure 2D:
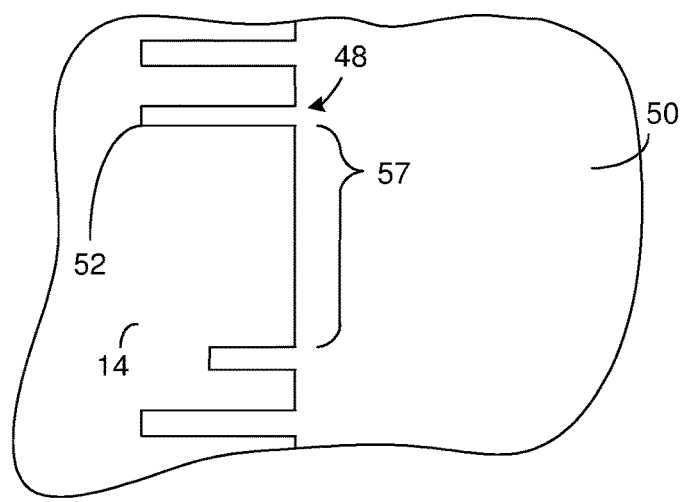
Figure 2E:
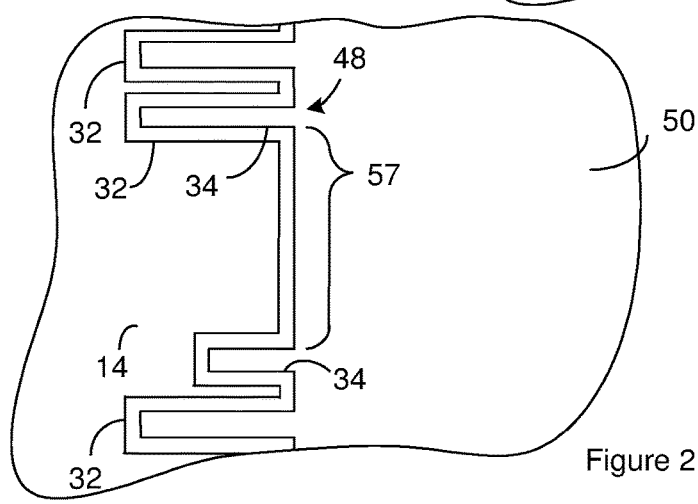

The mask(s) 49 can be removed after forming the preliminary channels 52 in the sheet of material 48 or after widening of the preliminary channels 52. FIG. 2D illustrates the mask(s) 49 removed after widening of the preliminary channels 52; however, the mask(s) 49 can be removed after forming the preliminary channels 52 in the sheet of material 48 and before widening of the preliminary channels 52. After removing the mask(s) 49 from the sheet of material 48, inactive region(s) 57 are formed on the sheet of material 48 as evident in FIG. 2D. The inactive region(s) 57 are located on the regions of the sheet of material 48 where the masks were previously positioned.

The anode metal oxide 12 is formed on the anode metal 14 that is exposed in the exposed portion of the sheet of material 48. For instance, the anode metal oxide 12 can be formed on the anode metal 14 that is exposed in FIG. 2D so as to provide a sheet of material 48 according to FIG. 2E. The anode metal oxide 12 extends into the channels 32 so as to provide anode oxide channels 34. Forming the anode metal oxide 12 on the exposed anode metal 14 can include converting a portion of the existing anode metal 14 to the anode metal oxide 12 or adding a layer of the anode metal 14 over the previously existing anode metal 14. Converting a portion of the existing anode metal 14 to the anode metal oxide 12 can include reacting the anode metal 14 with a component such as oxygen. The anode metal oxide 12 is formed so the anode metal oxide 12 is in a first phase of the anode metal oxide 12. As an example, when the anode metal 14 is aluminum, the boehmite phase (AlO(OH)) of aluminum oxide is formed as the anode metal oxide 12. The first phase of the anode metal oxide 12 is desirable for the final capacitor. For instance, the first phase of the anode metal oxide 12 generally serves as the dielectric for the capacitor.

An example of a suitable method of forming the anode metal oxide 12 on the anode metal 14 includes an optional hydration layer formation operation, one or more oxide formation operations, and one or more thermal treatments. In some instance, the hydration layer formation operation is optionally performed before the one or more oxide formation operations and the one or more oxide formation operations are performed before the one or more thermal treatments.

The hydration layer formation operation forms a hydration layer in direct contact with the exposed anode metal 14. The hydration layer can include, consist of, or consist essentially of the anode metal 14, hydrogen, and water. For instance, the hydration layer can include, consist of, or consist essentially of a hydrate of the anode metal 14. When the anode metal 14 is aluminum, the hydration layer can include, consist of, or consist essentially of aluminum hydrate.

In some instances, the hydration layer is formed on the anode metal 14 by placing the sheet of material 48 in a bath liquid that includes, consists of, or consists essentially of water. In one example, the bath liquid is de-ionized water. The bath liquid may be held at a temperature between 60° C. and 100° C. In some instances, the bath liquid is maintained at about 95° C. The sheet of material 48 can remain in the bath liquid for a formation time. The formation time can be greater than 1 minute and/or less than 20 minutes. The hydration can help form a better quality oxide during the one or more oxide formation operations.

An example of a suitable oxide formation operation includes, but is not limited to, mechanisms that convert existing anode metal 14 to anode metal oxide 12 such as anodic oxidation. In anodic oxidation, the sheet of material 48 is placed in an electrolytic bath while a positive voltage is applied to the sheet of material 48. The thickness of the layer of anode metal oxide 12 can be increased by increasing the applied voltage. When the anode metal 14 is aluminum, anodic oxidation forms a layer of the boehmite phase (AlO(OH)) of aluminum oxide on a layer of aluminum. In one example of anodic oxidation, the anode metal oxide 12 is formed by placing the sheet of material in citric acid while a positive voltage of 400-550 volts is applied to the sheet of material for a period of time between 30 minutes to 150 minutes. Additionally or alternately, the electrical current that results from the applied voltage can be monitored and the sheet of material can be removed from the electrolytic solution in response to the electrical current exceeding a treatment threshold.

The layer of oxide formed during the first oxide formation operation performed on the sheet of material replaces and/or consumes the hydration layer formed during the hydration layer formation operation. As a result, the hydration layer is generally not present on the layer of material after the first oxide formation operation.

In some instances, the thermal treatments are each performed after an oxide formation operation. The thermal treatments elevate the temperature of the sheet of material enough to drive out water from the layer of anode metal oxide 12 formed during the previous oxide formation operation(s). The removal of this water has been shown to decrease the leakage of capacitors. However, it is not desirable to remove all of the water from the layer of anode metal oxide 12. Additionally, applying high levels of thermal energy to the sheet of material can increase the level of deformation in a capacitor that includes an electrode made from the sheet of material. As a result, reducing the amount of thermal energy applied to the sheet of material while removing this water may lead to both decreased leakage and decreased deformation.

A suitable thermal treatment includes one or more thermal compression operations. An example of a suitable thermal compression operation is compressing the sheet of material between surfaces for a compression time with at least one of the surfaces having an elevated temperature during the compression.

Figure 2F:
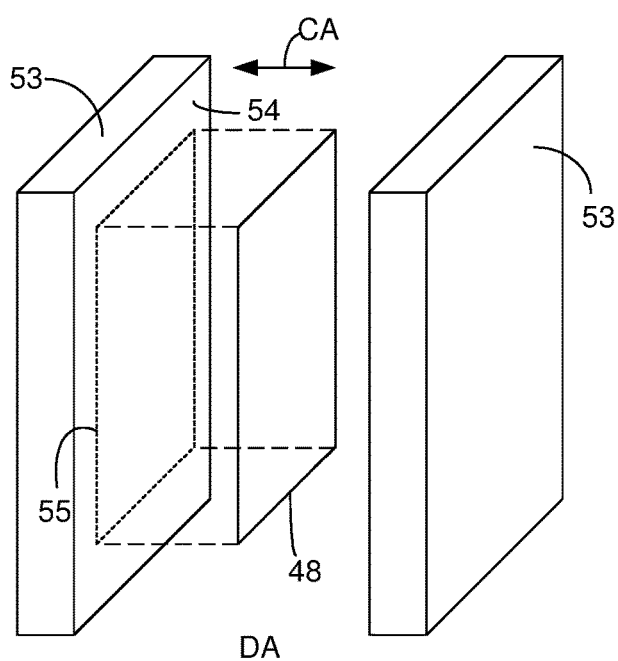
Figure 2F:
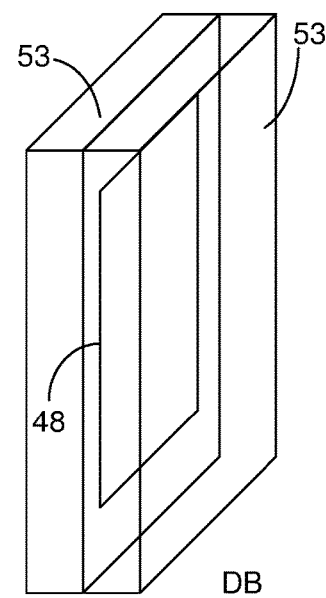

FIG. 2F illustrates an example of a compression mechanism for performing a compression operation. The compression mechanism includes two compression members 53. In FIG. 2F, a metal plate serves as each of the compression members. Each of the compression members includes a compression surface 54 that is in direct contact with the sheet of material 48 during the compression operation. A contact portion 55 of each compression surface is the portion of the surface that is in contact with the sheet of material during the compression operation. The location of the contact portion on one of the compression members in diagram DA of FIG. 2F is illustrated by dashed lines.

As is evident from the arrow labeled CA in FIG. 2F, the compression members can be moved relative to one another. For instance, a first one of the compression members can be immobilized while the second compression member is moved relative to the first compression member. Alternately, both of the compression members can be moved.

To prepare for the compression operation, the sheet of material is placed between the compression members as shown in diagram DA of FIG. 2F. The compression members are then moved relative to one another so the contact portion of each compression surface is in direct physical contact with the sheet of material as shown in diagram DB of FIG. 2F. The compression surfaces apply pressure to the sheet of material during the compression operation. The compression operation continues for the compression time that is desired for the compression operation. After the compression time associated with the last compression operation is reached, the compression members can be moved apart and the sheet of material removed from between the compression members.

Although FIG. 2F shows the compression members as plates, the compression members can be other components. For instance, one of the compression members can be the side of an oven or the side of some other structure. Additionally or alternately, the compression members can be different structures. For instance, one of the compression members can be a plate as shown in FIG. 2F while another compression member is a side of an oven.

Although FIG. 2F shows the compression members as being independent of one another, the compression members may be physically connected to one another. For instance, the compression members can be hinged or can be different parts of a medium that is connected by a fold.

One or more of the compression members apply thermal energy to the sheet of material during a compression operation. For instance, the one or more compression members can heat the sheet of material during a compression operation. As an example, the contact portion of one or more of the compression surface can be at a compression temperature that is above room temperature. One or more of the compression members can include a heating mechanism for bringing the contact portion of a compression surface to the desired compression temperature. For instance, a resistive heater can be mounted on a plate that serves as a compression member. Alternately, a plate that serves as a compression member can include one or more channels through which a heated fluid is flowed. In some instances, the heating mechanism for bringing one or more of the compression surfaces to the desired compression temperature can be external to one or more of the compression members. For instance, the compression members can be located in an oven before and during the compression treatment. As an example, the compression members illustrated in FIG. 2F can be located in an oven before and during the compression treatment. The oven can be maintained at the compression temperature in order to keep the temperature of the contact portion of the compression surfaces at the desired compression temperature.

Each of the compression operations in a thermal treatment is performed for a compression time. The compression times associated with different compression operations can be the same or different. In some instances, the compression time is not long enough for the temperature of the sheet of material to reach the compression temperature. Accordingly, the temperature of the sheet of material at the end of the compression operation (final operation temperature) can be different from the compression temperature.

During a compression operation, a suitable pressure for applying to the sheet of material (compression pressure) is a pressure greater than 0.1 once per square inch or 1 once per square inch and/or less than 1.0 psi or 5.0 psi. During a compression operation, a suitable compression temperature for applying to the sheet of material is a temperature greater than 200° C., or 300° C., and/or less than 600° C., or 800° C. In some instances, the maximum temperature of the sheet of material during a compression operation is greater than 200° C., or 300° C., and/or less than 600° C., or 800° C. Suitable compression times include, but are not limited to, compression times greater than 1 second, 5 seconds and/or less than 10 seconds, 1 minute or ten minutes. In some instances, the compression pressure and/or compression temperature are held constant for the compression time during a compression operation.

In one example, a thermal treatment includes at least two compression operations performed at different pressure levels. A first one of the compression operations can be a low pressure compression and a second one of the compression operations can be a high pressure compression. The low pressure compression is performed at a lower compression pressure than the high pressure compression. In some instances, the high pressure compression is performed immediately after the low pressure compression without removing the sheet of material from between the compression members and without other compression operations being performed between the low pressure compression and the high pressure compression.

The low pressure compression can take advantage of the direct physical contact between the compression members and the sheet of material in order to quickly elevate the temperature of the sheet of material toward a final operation temperature that is desired for the start of the high pressure compression. Suitable compression pressures for the low pressure compression include, but are not limited to, pressures greater than 0.1 once per square inch or 1 once per square inch and/or less than 0.1 psi or 0.5 psi. Suitable compression temperatures for the low pressure compression include, but are not limited to, temperatures greater than 200° C., or 300° C., and/or less than 600° C., or 800° C. Suitable final operation temperatures for the low pressure compression include, but are not limited to, temperatures greater than temperatures greater than 200° C., or 300° C., and/or less than 600° C., or 800° C. Suitable compression times for the low pressure compression include, but are not limited to, times greater than 1 second, 5 seconds and/or less than 10 seconds, 1 minute or ten minutes. In some instances, the sheet of material is at or near room temperature before the low pressure compression. In some instances, the compression pressure and/or compression temperature are held constant or substantially constant for the compression time during the low pressure compression.

The high pressure compression can be performed for a duration that drives out the water from the layer of anode metal oxide 12 and/or that causes cracks to form in the anode metal oxide 12. Suitable compression pressures for the high pressure compression include, but are not limited to, pressures greater than 0.5 psi and/or less than 1.0 psi or 2.0 psi. Suitable compression temperatures for the high pressure compression include, but are not limited to, temperatures greater than 200° C., or 300° C., and/or less than 600° C., or 800° C. Suitable compression times for the high pressure compression include, but are not limited to, times greater than 1 second, 2 seconds and/or less than 10 seconds, 1 minute or ten minutes. In some instances, the compression temperatures for the high pressure compression is the same as the compression temperature for the low pressure compression. In some instances, the compression pressure and/or compression temperature are held constant or substantially constant for the compression time during the low pressure compression.

The increase in pressure between the low pressure compression and the high pressure compression can be done slowly. For instance, the increase in pressure can be at a rate greater than 0.0 psi/minute or 0.05 psi/min and/or less than 0.5 psi/min or 2 psi/min.

FIG. 2A through FIG. 2F illustrate a method of using fabrication to acquire a sheet of material 48 having an anode metal oxide 12 on an anode metal 14. Alternately, any stage of the sheet of material 48 shown in FIG. 2A through FIG. 2F can be acquired by purchase from a supplier.

Figure 2G:
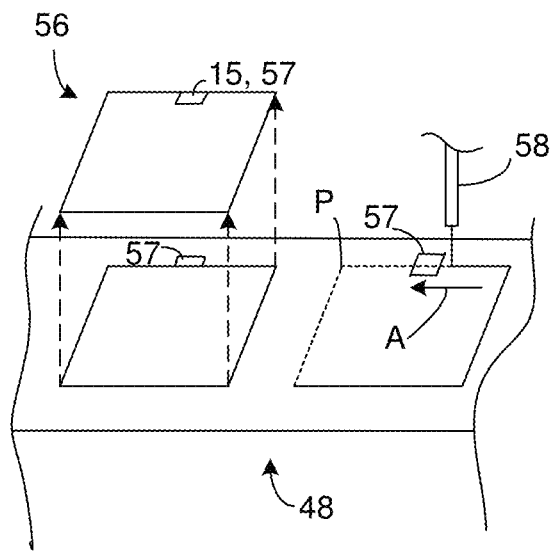

One or more anode precursors 56 are extracted from the sheet of material 48. Accordingly, a portion of the sheet of material 48 serves as the anode precursor 56. Suitable methods of removing an anode precursor 56 from the sheet of material 48 include, but are not limited to cutting the anode precursor 56 out of the sheet of material 48. A suitable method of cutting the anode precursor 56 out of the sheet of material 48 include mechanical cutting method such as die cutting where the anode precursor is punched or stamped from a sheet of material using a mechanical die. Another suitable method of cutting the anode precursor 56 out of the sheet of material 48 includes no-contact cutting methods such as laser cutting of the anode precursor 56. FIG. 2G illustrates use of a laser 58 to cut anode precursors 56 out of a sheet of material 48 constructed according to FIG. 2F although other mechanisms for removing the anode precursors 56 can be used.

The line along which an anode precursor 56 is removed from the sheet of material 48 (the separation line) is labeled P in FIG. 2G. The separation line passes through the inactive region(s) 57 of the sheet of material 48. As a result, the anode precursor 56 includes a portion of the inactive region(s) 57 of the sheet of material 48. At least a portion of the inactive region(s) 57 included on the anode precursors 56 will become the inactive region 15 on the anode formed from the anode precursors 56.

Figure 2H:
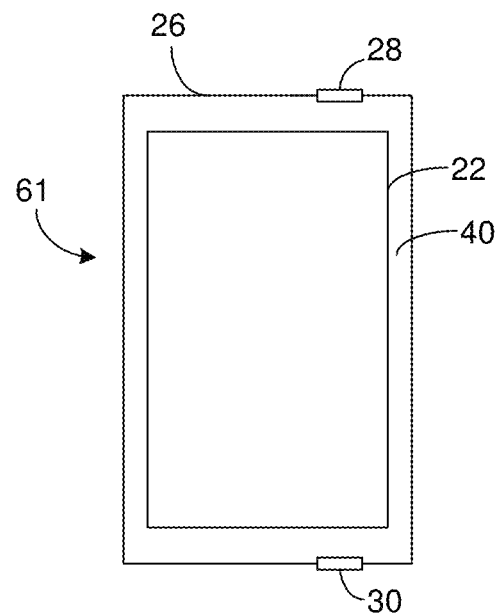

The one or more anode precursors 56 constructed according to FIG. 2A through FIG. 2G are included in a capacitor precursor 61 according to FIG. 2H. For instance, one or more of the anode precursors 56 are combined with one or more separators 24 and one or more cathodes 16 so as to form an electrode assembly 22 with the components arranged as disclosed in the context of FIG. 1A through FIG. 1F. The electrode assembly 22 is placed in a capacitor case 26 along with the electrolyte 40. Any electrical connections needed for operation of the capacitor precursor 61 are made and the capacitor case 26 is sealed.

The capacitor precursor 61 can optionally be put through an aging phase. The aging phase can be configured to form an anode metal oxide 12 on the edges on the one or more anode precursors 56 in the capacitor and/or on any other exposed anode metal 14. The aging process can use water in the electrolyte 40 to form the oxide. The phase of the anode metal oxide 12 formed during the aging phase is not necessarily the same as the first phase of the anode metal oxide 12. For instance, when the anode metal 14 is aluminum, the anode metal oxide 12 formed during the aging phase is not the boehmite phase (AlO(OH)) but is similar. Suitable methods for aging the capacitor precursor 61 include, but are not limited to, holding the capacitor at an elevated temperature while charged. For instance, in some instances, aging includes holding the capacitor at a temperature greater than 50° C. or 70° C. and/or less than 100° C. or 200° C. for a time greater than 2 hours, or 20 hours, and/or less than 50 hours or one hundred hours while charged to a voltage greater than 50 V, or 200 V and/or less than 600 V or 800 V. In one example, aging includes holding the capacitor at about 85° C. for 24 to 36 hours while charged to about 400 V.

The capacitor precursor 61 can optionally be put through a testing phase. The testing phase can be configured to test the capacitor precursor 61 for charge and discharge functionality. Completion of the testing phase can provide the anode and capacitor of FIG. 1A through FIG. 1H. Accordingly, the capacitor is ready for use in the desired application and/or for resale.

Figure 3:
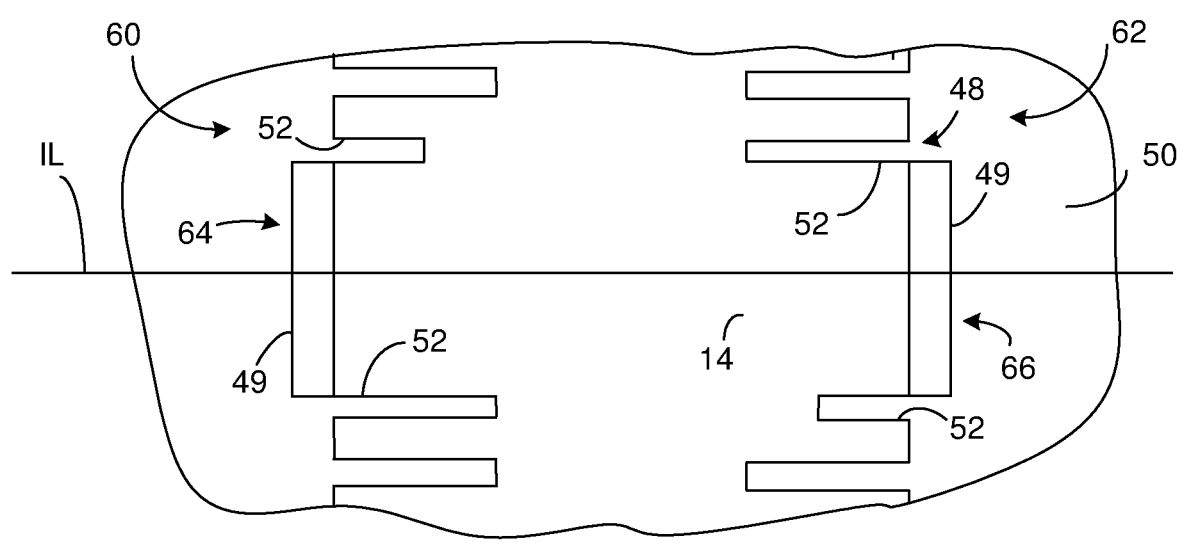
FIG. 3 is a cross section of a portion of a sheet of material showing masks that are aligned with one another on opposing sides of the sheet of material.

The construction and arrangement of the masks 49 are not shown in detail in the method of FIG. 2A through FIG. 2H. FIG. 3 is a cross section of a portion of the sheet of material 48 after formation of the preliminary channels 52 and before removal of the masks 49. A first one of the masks 49 is positioned on a first side 60 of the sheet of material 48 and a second one of the masks 49 is positioned on a second side 62 of the sheet of material 48. The masks are aligned with one another on the opposing sides of the sheet of material 48. For instance, an imaginary line labeled IL in FIG. 3 can be perpendicular to the first side or the second side can extend through a center of the first mask 64 and the second mask 66. The center can be the centroid.

Figure 4A:
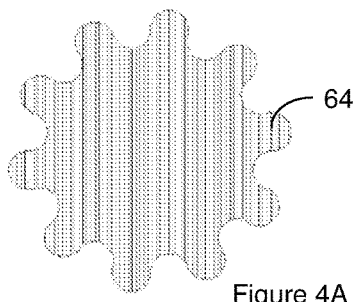
FIG. 4A through FIG. 4D illustrate a first mask and a second mask suitable for use with a sheet of material from which an electrode is constructed.
Figure 4B:
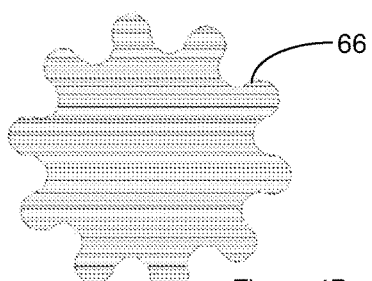
Figure 4C:
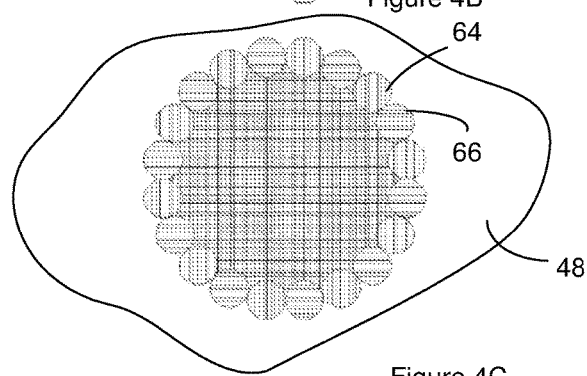
Figure 4D:
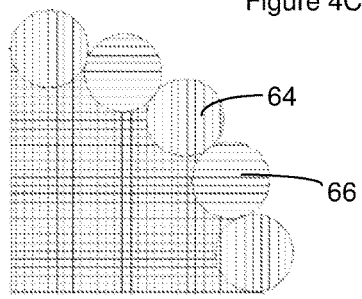
Figure 4E:
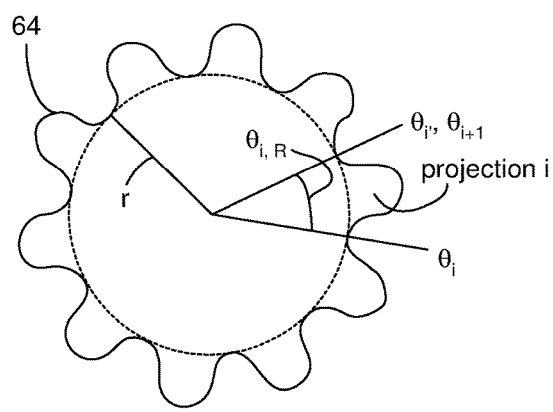
FIG. 4E is a magnified view of a first mask and a second mask of FIG. 4A through FIG. 4D. The first mask and the second mask of FIG. 4E are not aligned but have the same angular orientation as shown in FIG. 4C and FIG. 4D.
Figure 4E:
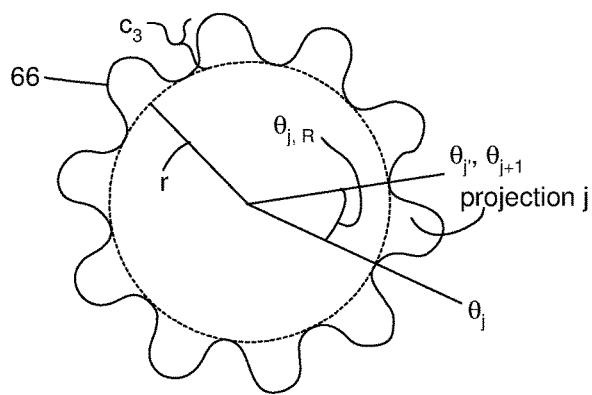

The shape of the first mask 64 and the second mask 66 is selected to reduce strain at the interface between the active region and the inactive region of an electrode such as an anode. FIG. 4A through FIG. 4D illustrate a first mask 64 and a second mask 66 suitable for use with the sheet of material 48. FIG. 4A is a topview of the first mask 64 and FIG. 4B is a bottomview of the second mask. FIG. 4C is a topview of portion of the sheet of material 48 that includes the first mask 64 aligned with the second mask 66. In FIG. 4C, the first mask 64 and the sheet of material 48 are treated as transparent. As a result, the features underlying the first mask 64 are evident in FIG. 4C. The sheet of material 48 shown in FIG. 4C can be before or after fabrication of one, two, or three components selected from the group consisting of the anode metal oxide, the channels and the anode oxide channels. FIG. 4D is a magnified view of an edge of the first mask 64 and the second mask 66 arranged as shown in FIG. 4C. The vertical lines shown on the first mask 64 and horizontal lines shown on the second mask 66 of FIG. 4A through FIG. 4D are provided for the purposes of showing relative orientation of the first mask 64 and the second mask 66 and do not represent physical features on the first mask 64 and the second mask 66. FIG. 4E is a magnified view of a first mask 64 and a second mask 66. Although the first mask 64 and the second mask 66 of FIG. 4E are not aligned, they each have the same angular orientation as shown in FIG. 4C and FIG. 4D.

The first mask 64 and the second mask 66 include projections extending inwards or outwards from an imaginary circle shown by the dashed circles in FIG. 4E. The first mask 64 and the second mask 66 of FIG. 4A through FIG. 4E are shown extending outwards from a circle. Each of the projections contacts the circle twice. In FIG. 4A through FIG. 4E, the circle is tangent to the perimeter of the mask 49. However, as will be shown below, the circle can pass through vertices on the perimeter of the mask 49. Accordingly, the projections can be constructed such that the circle is tangent to a projection at two locations, pass through a vertex at two locations, or is tangent to a projection at one location and passes through a vertex at another location.

The projections in the first mask 64 are each associated with a projection index labeled i=1 through N, the index increases with increasing angle, and the projection with index i=1 straddles or originates at the angle θ=0°. The value of N can be a function of circle diameter or circumference. For instance, a circle with a circumference of 10 mm can have N=20. Examples of suitable values of N include values greater than or equal to 3 or 4 and/or less than 40, or even 100. Each projection i intersects the circle twice: once at an angle $\theta_i$; and again at an angle $\theta_{i'}$. In some instances, the projections are spaced apart on the circle and the angular separation between adjacent projections can be called $\theta_{i,s}$ (not shown) where $\theta_{i,s}$ indicates any angular separation between projection i and projection 1+1. In other instances, the projections are adjacent to one another without being spaced apart as shown in FIG. 4A through FIG. 4E. In these instances, $\theta_{i'}=\theta_{i+1}$. The angular range of the circle that each projection occupies is $\theta_{i,R}$. The angular range can be determined as an absolute value of the difference between the angles where projection i intersects the circle. For instance, the angular range can be determined from $\theta_{i,R}=|\theta_{i'}-\theta_i|$. The projections can be periodically arranged around the circle. For instance, each projection can have the same shape, the angular range ($\theta_{i,R}$) is the same for each projection i, and the angular separation ($\theta_{i,s}$) is the same for each projection i. In another example, each projection has the same shape, the angular range ($\theta_{i,R}$) is the same for each projection i, and the angular separation is 0.0° for each projection i. When the projections have a periodic arrangement, the projections have an angular period of $P=\theta_{i,R}+\theta_{i,s}$.

The projections in the second mask 66 are each associated with a projection index labeled j=1 through M, the index increases with increasing angle. The value of M can be a function of circle diameter or circumference. For instance, a circle with a circumference of 10 mm can have M=20. Examples of suitable values of M include values greater than or equal to 3 or 4 and/or less than 40, or even 100. Each projection j intersects the circle twice: once at an angle $\theta_j$; and again at an angle $\theta_{j'}$. In some instances, the projections are spaced apart on the circle and the angular separation between adjacent projections can be called $\theta_{j,s}$ (not shown) where $\theta_{j,s}$ indicates any angular separation between projection j and projection j+1. In other instances, the projections are adjacent to one another without being spaced apart as shown in FIG. 4A through FIG. 4E. In these instances, $\theta_{j'}=\theta_{h+1}$. The angular range of the circle that each projection occupies is $\theta_{j,R}$. The angular range can be determined as an absolute value of the difference between the angles where projection i intersects the circle. For instance, the angular range can be determined from $\theta_{j,R}=|\theta_{j'}-\theta_j|$. The projections can be periodically arranged around the circle. For instance, each projection can have the same shape and size, the angular range ($\theta_{j,R}$) is the same for each projection j, and the angular separation ($\theta_{j,s}$) is the same for each projection j. In another example, each projection has the same shape and size, the angular range ($\theta_{j,R}$) is the same for each projection j, and the angular separation is 0.0° for each projection j. When the projections have a periodic arrangement, the projection have an angular period of $P=\theta_{j,R}+\theta_{j,s}$.

In some instances, the second mask 66 has the same size and shape as the first mask 64. For instance, each projection i and j can have the same shape and size, the angular ranges ($\theta_{j,R}$ and $\theta_{i,R}$) can be the same ($\theta_R$) for all values of i and j and the angular separations ($\theta_{j,s}$ and $\theta_{i,s}$) is the same ($\theta_S$) for each projection i and j. In another example, each projection i and j has the same shape and size, the angular ranges ($\theta_{j,R}$ and $\theta_{i,R}$) are the same for all values of i and j and the angular separations ($\theta_{j,s}$ and $\theta_{i,s}$) is 0.0° for each projection i and j.

The second mask 66 can be rotated relative to the first mask 64 by a constant value. For instance, the second mask can be arranged such that $\theta_j=\theta_i+c°$ and $\theta_{j'}=\theta_{i'}+c°$ where c° is a constant. In FIG. 4C and FIG. 4D, the second mask 66 is rotated relative to the first mask 64 by one half the period. For instance, c°=P/2, or c°=($\theta_R+\theta_S$)/2, or c°=($\theta_R$)/2 when $\theta_S$=0.0°.

In FIG. 4E, the circle has a radius labeled r in FIG. 4E and the amplitude of the projections is labeled $c_3$. In some instances, the radius is greater than 0.05 inches, 0.125 inches and/or less than 0.25 inches or 1 inch and/or the amplitude of the projections is greater than 1%, or 5% and/or less than 7.5% or 50% of the diameter.

Figure 4F:
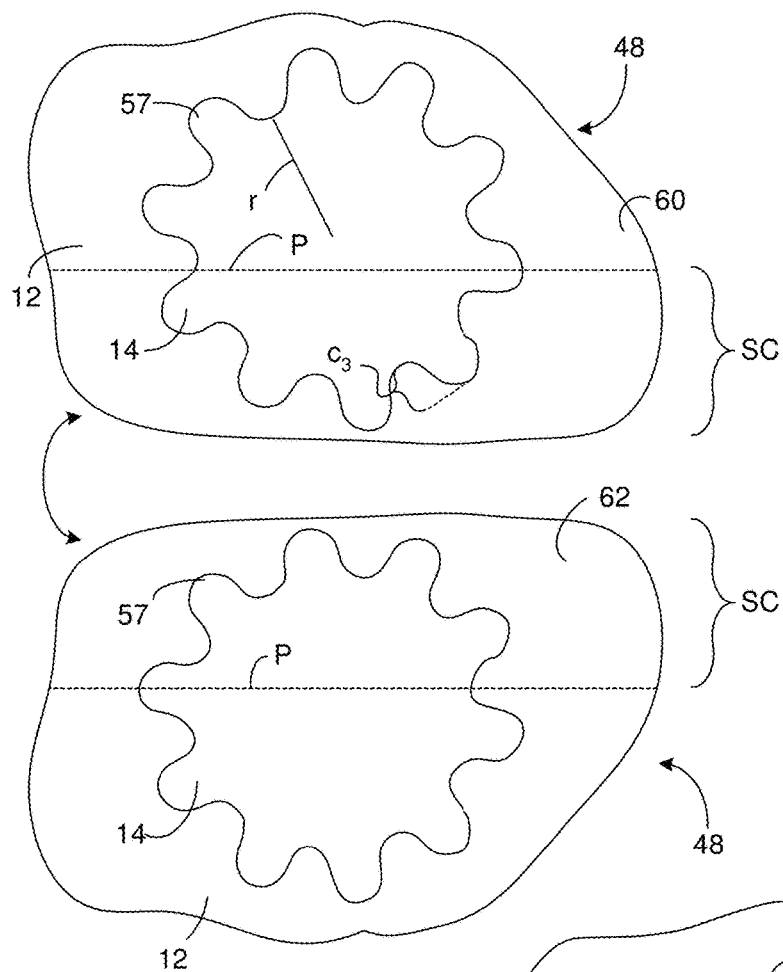
FIG. 4F illustrates a portion of a first side of the sheet of material of FIG. 4C and the corresponding portion from the second side of the sheet of material. The first mask and the second mask have been removed from the sheet of material exposing an inactive region on the first side and on the second side of the sheet of material.

FIG. 4F illustrates a portion of a first side of the sheet of material 48 and the corresponding portion from the second side of the sheet of material 48. The first mask and the second mask have been removed from the sheet of material 48 exposing an inactive region 57 on the first side and on the second side of the sheet of material 48. As discussed above, the inactive region 57 excludes one, two, or three components selected from the group consisting of the anode metal oxide 12, the channels 32 and the anode oxide channels 34. In contrast, the regions of the sheet of material 48 that contact the inactive regions include the channels 32, anode oxide channels 34, and anode metal oxide 12 on the sheet of material 48 discussed above in the context of FIG. 2A through FIG. 2H. The channels and anode oxide channels are not shown in FIG. 4F. The shape and orientation of the first mask and the second mask inactive regions 57 is transferred to the inactive regions 57. Accordingly, the inactive regions 57 can each include projections extending from a circle as disclosed in the context of the first mask and the second mask.

The path along which an anode precursors 56 is removed from the sheet of material 48 (the separation path) is labeled P on the first side 60 and the second side 62 of the sheet of material 48 shown in FIG. 4F. The separation line passes through the inactive regions 57 of the sheet of material 48.

Figure 4G:
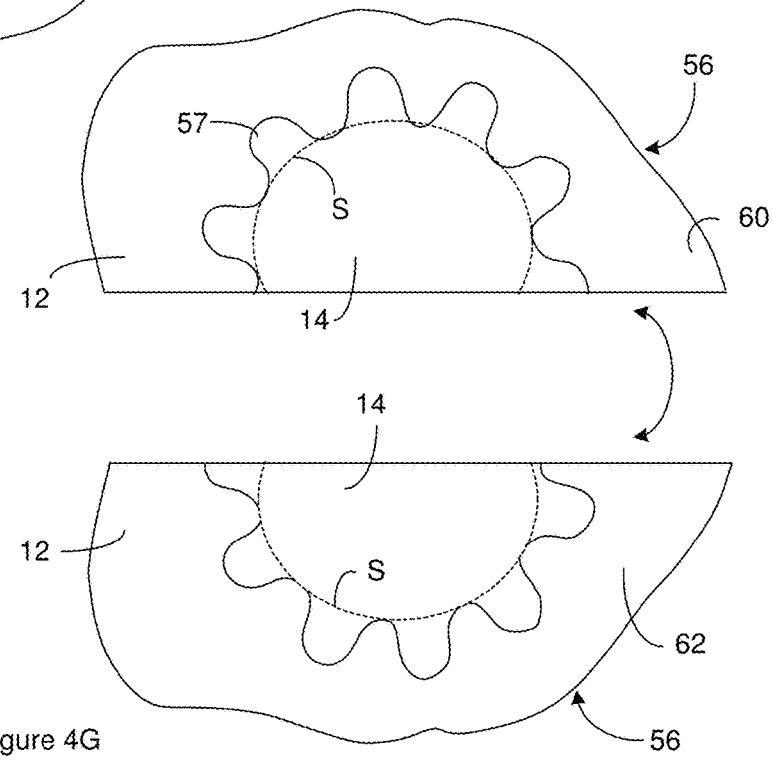
FIG. 4G shows the first side and the second side of a portion of the anode precursor after removal of the anode precursor from the sheet of material of FIG. 4F.

FIG. 4G shows the first side 60 and the second side 62 of a portion of the anode precursor 56 after removal of the anode precursor from the sheet of material 48. The anode precursor 56 includes a portion of the inactive regions 57 from the sheet of material 48. Because the separation line extended through the inactive regions 57, a portion of each inactive region 57 is maintained on the anode precursor 56. For instance, the portion of inactive regions 57 on the anode precursor 56 includes one, two, three, four, or more projections and zero to two partial projections extending from a semicircle rather than the circle disclosed above. Additionally, the one or more projections extend from a semicircle (labeled S in FIG. 4G) that can be a portion of the circle from which the projections previously extended. The separation path can be selected such that a perimeter of the semicircle on the anode precursor includes more than 30%, or 50% and/or less than 90%, or 100% of the circumference of the imaginary circle from the sheet of material 48.

As is evident from a comparison of FIG. 4F and FIG. 4G, a portion of the inactive region 57 is not retained on the anode precursor 56. For instance, the portion of the inactive region 57 labeled SC in FIG. 4F is not included in the anode precursor 56. As a result, this portion of the inactive region does not actually need to be fabricated on the sheet of material 48. As a result, the masks 49 (first mask 64 and second mask 66) and/or the inactive region 57 on the sheet of material can include one, two, three, four, or more projections and zero to two partial projections extending from a semicircle rather than the circle and associated projections disclosed above.

Figure 4H:
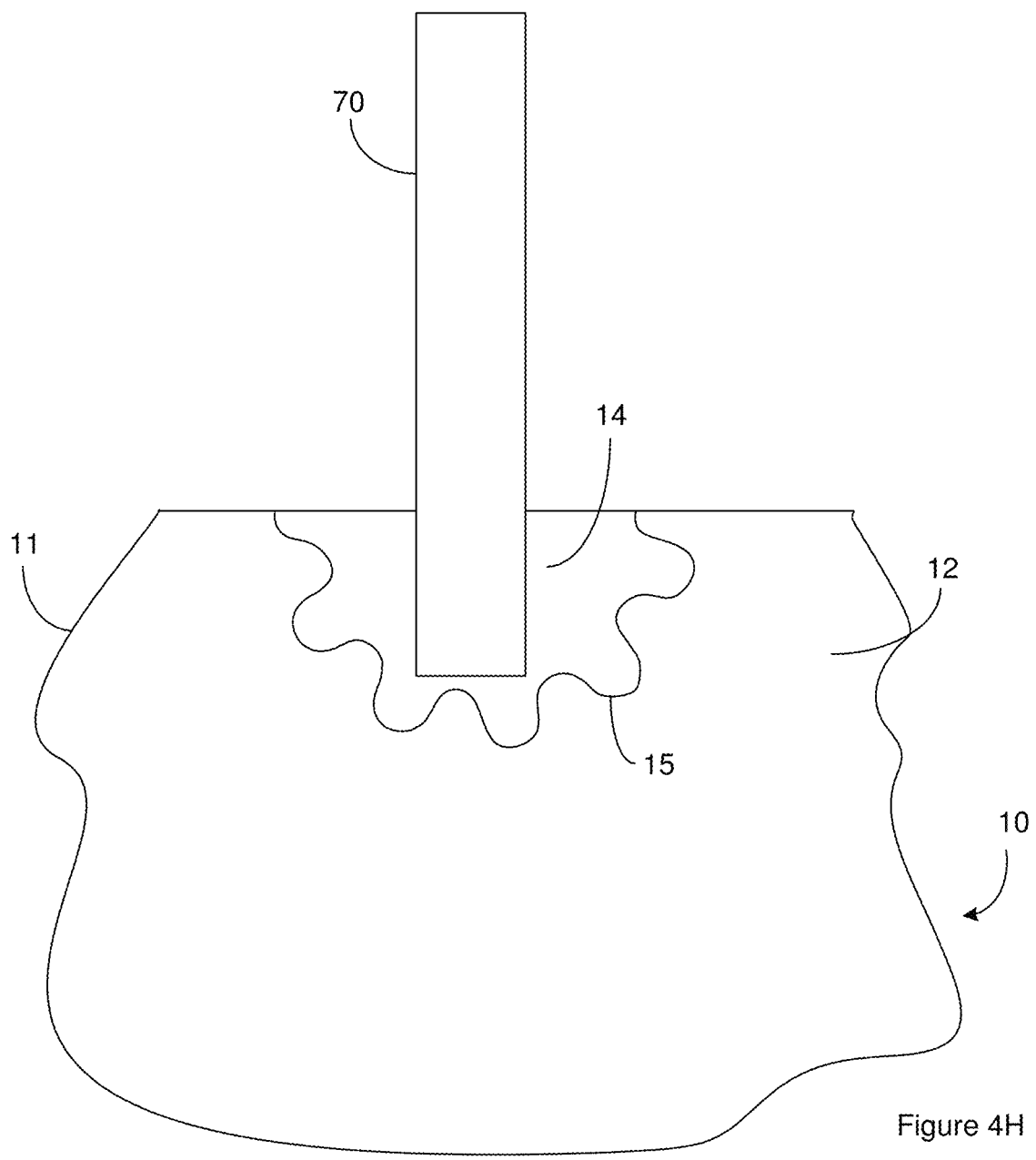
FIG. 4H illustrates a portion of an anode generated from the anode precursor of FIG. 4G.

FIG. 4H illustrates a portion of an anode 10 generated from the anode precursor 56 of FIG. 4G. The portion of the inactive region 57 included on the anode precursor 56 becomes the inactive region 15 on the anode. An electrical conductor such as a tab 70 is connected to the inactive region 15 on the anode by a technique such as welding. The inactive region 15 can have a surface area sized such that the welding process removes the anode metal oxide 12 from all or a portion of the inactive region 15. As a result, all or a portion of the inactive region 15 can include the anode metal oxide 12 or all or a portion of the inactive region 15 can exclude the anode metal oxide 12. For the purposes of illustration, FIG. 4F through FIG. 4H illustrate the inactive region 15 without the anode metal oxide 12. The resulting anode is suitable for use in the fabrication of an electrode assembly, capacitor precursor, and capacitor.

As noted above, the projections can be periodically arranged around the circle and accordingly around the resulting semicircle. In some instances, this can be represented using simple mathematical equations. For instance, using polar coordinates (p, θ), a suitable perimeters for the first mask and the second mask can be represented by $p=r+c_3 \cos(c_1\theta \pm c_2)$ where p represents the perimeter of the first mask 64 and/or the second mask 66, $c_2$ represents a constant that is greater than or equal to 0° and less than or equal to 360°, $c_3$ represents the amplitude of the projections, and $c_1$ represents a positive or negative integer that is not equal to zero. The constant $c_2$ represents the angular rotation of the perimeter. Accordingly, in order to provide the desired rotation of the first mask 64 relative to the second mask, the value of $c_2$ can be different for the first mask 64 and the second mask 66. In some instances, the values of r, $c_3$, and $c_1$ are $c_2$ are the same for the first mask 64 and the second mask 66 but the value of $c_2$ is different for the first mask 64 and the second mask 66.

FIG. 4A through FIG. 4H illustrate an example of the projection shape where the perimeter of each projection is curved. FIG. 4A through FIG. 4H illustrate an example of the projection shape where the perimeter of each projection is curved. However, the perimeter of each projection can include one or more straight segments and/or one or more curved segments. FIG. 5A through FIG. 5D illustrate an example of a first mask 64 and a second mask 66 each the perimeter of each projection includes only straight segments. FIG. 5A is a topview of the first mask 64 and FIG. 5B is a bottomview of the second mask. FIG. 5C is a topview of portion of the sheet of material 48 that includes the first mask 64 aligned with the second mask 66. In FIG. 5C, the first mask 64 and the sheet of material 48 are treated as transparent. As a result, the features underlying the first mask 64 are evident in FIG. 5C. FIG. 5D is a magnified view of an edge of the first mask 64 and the second mask 66 arranged as shown in FIG. 5C.

FIG. 6A through FIG. 6D illustrate an example of a first mask 64 and a second mask 66 each the perimeter of each projection includes a straight segment and a curved segment. FIG. 6A is a topview of the first mask 64 and FIG. 6B is a bottomview of the second mask. FIG. 6C is a topview of portion of the sheet of material 48 that includes the first mask 64 aligned with the second mask 66. In FIG. 5C, the first mask 64 and the sheet of material 48 are treated as transparent. As a result, the features underlying the first mask 64 are evident in FIG. 6C. FIG. 6D is a magnified view of an edge of the first mask 64 and the second mask 66 arranged as shown in FIG. 6C.

As is evident from FIG. 4A through FIG. 4G, the projections can be symmetrical around a line that is perpendicular to the circle or semicircle. Alternately, as is evident from FIG. 5A through FIG. 6D, the projections can be asymmetrical around a line that is perpendicular to the circle or semicircle.

In some instances, the first mask 64 are second mask 66 are arranged such that the orientation of the projections in the first mask 64 are reversed relative to the orientation of the projections in the first mask 64. For instance, when looking at the sheet of material from a single side, the second mask 66 can be a mirror image of the first mask 64 but with the second mask 66 rotated relative to the first mask 64 as disclosed above and as shown in FIG. 5A through FIG. 6D. Accordingly, the second mask and can have the same shape as the first mask, but can be a mirror image of the first mask when looking at the sheet of material from a single side, and can be rotated relative to the first mask 64 as disclosed above and as shown in FIG. 5A through FIG. 6D. Alternately, the first mask 64 and the second mask 66 are arranged such that the orientation of the projections have the same orientation relative to one another as shown in FIG. 4A through FIG. 4G.

In some instances, the rotation of the second mask is such that segments of the first mask 64 align with segments of the second mask 66. For instance, linear segments on the mask of FIG. 5A and FIG. 5B become aligned as shown in FIG. 5C and FIG. 5D. As an example, the linear segments that are circled in FIG. 5A and FIG. 5B are aligned on the sheet of material 46 shown in FIG. 5C in that one of the segments is positioned directly over the aligned segment on the sheet of material. As a result, a line can be drawn perpendicular to a face of the sheet of material and through the aligned segments for a continuous length of the segments. These features of the first mask 64 and the second mask 66 transfer to the inactive regions that result from the first mask 64 and the second mask 66. This alignment of segments on the resulting inactive region(s) can enhance the degree of strain relief provided by the inactive regions.

Removal of the first mask 64 and the second mask 66 from the sheet of material causes the features attributed the shape, size, geometry and orientations of the first mask 64 and/or the second mask 66 to be transferred or substantially transferred to the resulting inactive regions on the sheet of material and/or on the electrode. In some instances, a substantial transfer of the features occurs as a result of undercutting that occurs during etching. Accordingly, the description of the shape, size, geometry and orientation of the first mask 64 and the second mask 66 also apply to the inactive regions formed on the sheet of material and to at least a portion of each of the resulting inactive regions on the electrode.

The sequence of events disclosed above for forming an anode and/or a capacitor can be performed in a sequence other than the disclosed sequence. For instance, the aging phase can be performed after the testing phase.

Although the above methods of forming an anode have been disclosed in the context of a capacitor, the above methods of forming anode to the fabrication of anodes, cathodes, positive electrodes, and/or negative electrodes in other energy storage devices such as batteries.

Figure 7:
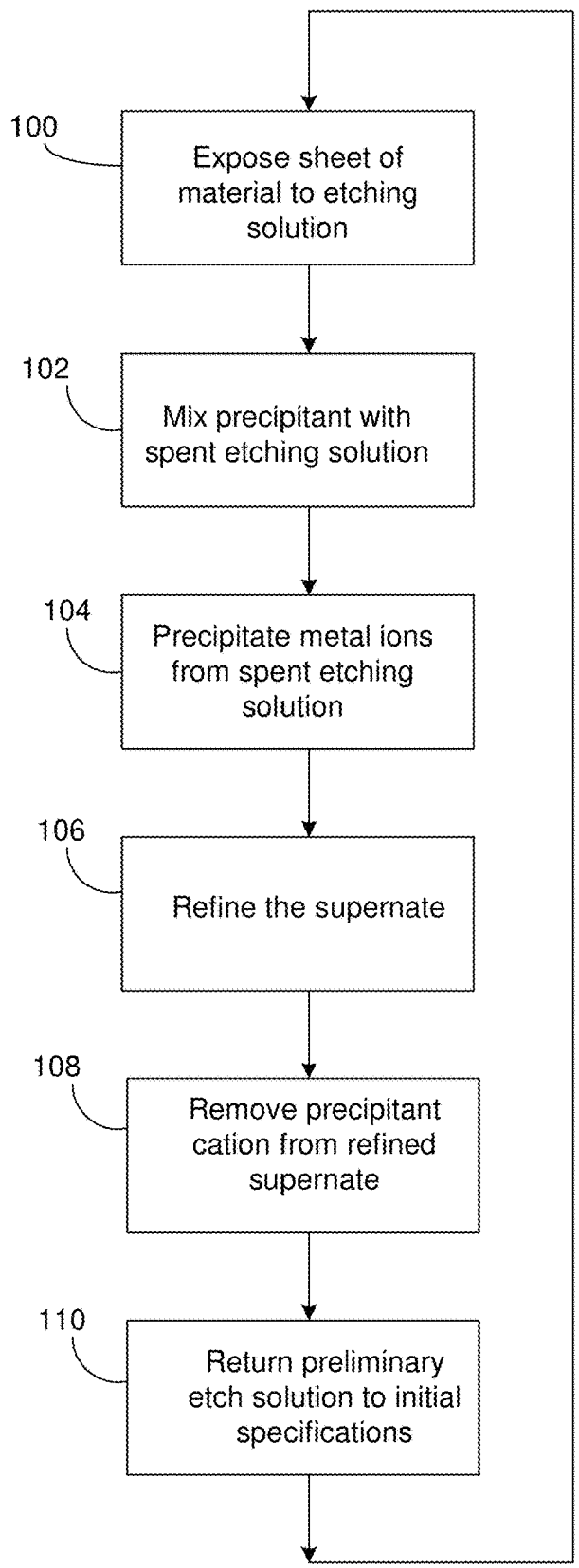
FIG. 7 is a flow diagram for a process of recovering one or more chemicals from spent etching solution.

FIG. 7 is a flow diagram for a process of recovering one or more chemicals from spent etching solution. At process block 100, a sheet of material in which the preliminary channels 52 are to be formed is placed in a bath of etching solution. The sheet of material typically includes, consists essentially of, or consists of a metal such as aluminum. In some instances, the etching solution includes or consists of one, two, three, or four chemical components selected from a group consisting of acids, oxidizers, and surfactants. When forming tunnels in a sheet of material that includes or consists of aluminum, an example of a suitable etching solution for forming tunnels includes or consists of hydrochloric acid and sulfuric acid as acids, sodium perchlorate as an oxidizer, and potassium perfluorobutane sulfonic acid (KFBS) as a surfactant.

The etching solution contains the chemical components at concentrations that fall within an initial component specification. The initial component specification can specify concentrations of all or a portion of the chemical components in the component specification. Examples of concentrations include, but are not limited to, molar concentrations, weight concentrations, weight percentages, molar percentages, and ppm. As an example, an initial component specification for an etching solution that includes or consists of hydrochloric acid, sulfuric acid, sodium perchlorate, and potassium perfluorobutane sulfonic acid (KFBS) call for hydrochloric acid in a range of 0.60 to 0.80 wt %, sulfuric acid in a range of 0.80 to 1.0 wt %, sodium perchlorate in a range of 3.0 to 4.0 wt %, and potassium perfluorobutane sulfonic acid (KFBS) in a range of 0 to 100 ppm with the remainder as water such as deionized water or tap water.

After the etching solution is contacted with the sheet of material, the spent etching solution includes dissolved metal ions from the sheet of metal. As a result, the spent etching solution includes or consists of one, two, three, four, or five chemical components selected from a group consisting of acids, oxidizers, surfactants, and dissolved metal ions from the sheet of material. For instance, when the sheet of material is aluminum, the spent etching solution can include one or more acids, an oxidizer, an optional surfactant, and dissolved aluminum ions. In one example, the spent etching solution includes hydrochloric acid and sulfuric acid as acids, sodium perchlorate as an oxidizer, potassium perfluorobutane sulfonic acid (KFBS) as a surfactant, and dissolved aluminum ions. In some instances, the spent etching solution has a pH level higher than 0.1 and/or less than 1.5 or 3.

At process block 102, the spent etching solution is mixed with a precipitant so to form a precipitation solution where a precipitate comes out of solution. The precipitant is selected such that the precipitate is a compound that includes the metal ions from the sheet of material. In some instances, the precipitate is a crystal structure that includes the metal ions.

In some instances, the precipitant is a solid or liquid base that is added to the precipitation solution so as to raise the pH of the precipitation solution at a level where the solubility of the precipitate in the precipitation solution drops to below the saturation level of the precipitate in the precipitation solution. The reduced solubility causes the precipitate to come out of the precipitation solution. Additionally, the precipitant can be selected such that when the precipitant is in the precipitation solution, the precipitant is disassociated into ions that include a precipitant anion and a precipitant cation. The precipitate can include the metal ions from the sheet of material and the precipitant anion and the precipitant cations can remain in the supernate.

As an example, when the spent etching solution includes aluminum cations, the precipitant can be sodium hydroxide (NaOH), a base that dissociates into sodium cations and hydroxide anions in water. Various phases of aluminum hydroxide such as ($Al(OH)_3$) and aluminum hydrate becomes less soluble in the precipitation solution at pH levels greater than 5.5 and less than 8.0. As a result, the sodium hydroxide can be added to the precipitation solution to increase the pH of the precipitation solution and cause aluminum hydroxide to precipitate from the precipitation solution. For instance, the sodium hydroxide (NaOH) can be added to the precipitation solution at levels that maintain the pH of the precipitation solution at pH levels greater than 5.5 and less than 8.0. In some instances, the precipitant is selected such that the precipitant cation is a base cation such as $K^+$, $Ca^{2+}$, $Mg^{2+}$, and $Na^+$. Examples of suitable precipitants include, but are not limited to, NaOH, KOH, $Ca(OH)_2$, and $Mg(OH)_2$. In some instances, the precipitant is selected such that the precipitant cation is also present in the etching solution before the addition of the precipitant in order to keep the precipitant compatable with the etching solution. For instance, the example etching solution set forth above includes Na⁺ from the sodium perchlorate. When NaOH is used as the precipitant with this etching solution, the Na⁺ precipitant cation is already present in the etching solution.

At process block 104, the precipitate is settled out of the precipitation solution. The combination of process block 102 and process block 104 results in mixing of the precipitation solution for a mixing period followed by settling of the precipitation solution for a settling period. The mixing period and the settling period can have an inverse relationship. For instance, increasing mixing periods can reduce the needed settling period. Suitable mixing periods include, but are not limited to, mixing periods greater than 1 hour or 7 hours and/or less than 48 hours. Suitable settling periods include, but are not limited to, settling periods greater than 24 hours and/or less than 72 hours, or 120 hours. In some instances, a ratio of the settling period to the mixing period is greater than 4:1, and/or less than 120:1.

The precipitate can be separated from the supernate. The separation can be concurrent with the settling of the precipitate or done after the settling of the precipitate. The precipitate can be disposed of, or stored for later disposal. Alternately, one or more metal ion tests can optionally be performed on a sample of the supernate before separating the precipitate and the supernate. The one or more metal ion tests can optionally be performed so as to determine if the metal ions have been removed from the supernate. Examples of suitable metal ion tests include, but are not limited to, colorimetry, mass spectrometry, and atomic absorption. When the one or more metal ion tests indicate that the concentration of the metal ion in the supernate is at or above an upper concentration threshold, the settling period can be extended or the precipitate and/or superanate can be discarded. When the settling period is extended, the one or more metal ion tests can optionally be performed again during and/or after the extended settling period so as to determine if the metal ions have been removed from the supernate.

When the one or more metal ion tests indicate that the concentration of the metal ion is supernate is below the upper concentration threshold, the precipitate is separated from the supernate. In some instances, the upper concentration threshold is greater than 0.1 mg/L and/or less than 2.0 mg/L.

At process block 106, one or more additional refining steps can optionally be performed on the supernate so as to further remove any additional particles from the sheet of material and/or precipitate from the supernate. For instance, the supernate can be filtered and/or decanted so as to generate a refined supernate. The refined supernate can serve as the supernate for the purposes of the following discussion. As will be discussed below, the refined supernate can be passed through an ion exchange resin. The one or more refining steps can be selected to remove particles from the sheet of material and/or precipitate with a size that is sufficient to clog the ion exchange resin. In some instances, the one or more refining steps are selected to remove particles with diameters of at least larger than 0.5 microns.

The precipitant cation is removed from the supernate so as to provide a recovery solution (process block 108). Suitable methods for removing the precipitant cation include, but are not limited to, ion exchange operations such as cation exchange. In some instances, the precipitant cation in the supernate is replaced with another cation such as hydrogen cations (ft). The removal of the precipitant cation can reduce the pH of the supernate by more than 1, 2, or 4 scales of pH. In some instance, the precipitant cation is removed from the supernate so as to provide a recovery solution with a pH less than 1.0.

Suitable cation exchange mechanisms include, but are not limited to, resin beds. The resin can include active sites that exchange a hydrogen cations (H⁺) for the precipitant cation (Na⁺ in the case of a NaOH precipitant). In some instance, the resin includes plastic beads or plastic microbeads such as AMBERLITE-FPC23-H. The recovery solution includes the acids that were originally present in the etching solution as a result of the exchange between the hydrogen cations (H⁺) for the precipitant cation. For instance, when the etching solution includes hydrochloric acid (HCl), the addition of precipitant such as NaOH to the etching solution effectively converts the hydrochloric acid (HCl) to sodium chloride and the subsequent exchange of the sodium cations for the hydrogen cations (H⁺) returns the sodium chloride to hydrochloric acid (HCl). Accordingly, the recovery solution includes the chemical components that were originally present in the etching solution. For instance, when the etching solution includes one or more acids, an oxidizer, the optional surfactant, the recovery solution includes the one or more acids, an oxidizer, and the optional surfactant when the surfactant was present in the etching solution. As an example, the recovery solution includes hydrochloric acid and sulfuric acid as acids, sodium perchlorate as an oxidizer, and potassium perfluorobutane sulfonic acid (KFBS) as a surfactant when the etching solution includes these components.

When a cation exchange process is used to remove the precipitant cations, the cation exchange resin can be refreshed. For instance, a regeneration solution can be flowed through the cation exchange resin so as to replace the precipitant cation at the active sites of the cation exchange resin with the hydrogen cations. In some instances, the regeneration solution includes an acid such as sulfuric acid. The resin bed can be refluidized to reduce compaction of the resin before introduction of the regeneration solution.

The spent regeneration solution can be analyzed one or more times to determine when the regeneration process is complete. For instance, the concentration of ions in the spent regeneration solution can be measured to determine when the regeneration solution starts to egress from the resin beds. Many factors such as flow rate, regeneration solution concentration, type of regeneration solution, direction of flow and regeneration time can contribute to the regeneration completeness. Suitable methods for analyzing the regeneration solution include, but are not limited to, titration. Regeneration can be considered to be complete when the concentration of ions in the spent regeneration solution falls below an ion concentration threshold. In some instances, the ion concentration threshold is chosen to indicate that insignificant amounts of ions remain to be exchanged by H+ ions in the exchange resin beds. Suitable ion concentration thresholds include, but are not limited to, ion concentration threshold less than 2 wt % and/or a change in concentration over time less than 0.15 wt %. As an example, a suitable Na+ ion concentration threshold includes, but is not limited to, an ion concentration threshold less than 2 wt % or a change in concentration over time less than 0.15 wt %

Although it is possible for the concentrations of each chemical component in the recovery solution to be within the initial chemical specifications, the concentrations of one or more of the chemical components in the recovery solution (the recovered etchant component concentrations) will generally be outside of the initial chemical specifications. For instance, methods of removing the precipitant cation, such as cation exchange, generally output the different components at different times and/or over different durations in the precipitant cation removal process. As a result, the recovery solution component concentrations will generally be outside of the initial component specification. In some instances, the recovery solution output from the ion exchanger can be periodically sampled and the samples analyzed to determine whether the chemical components are being output from the ion exchanger in the desired ratios. Suitable methods for analyzing the samples of the recovery solution include, but are not limited to, titration. In some instances, the titration is thermometric titration that measures the temperature change in the titration solution to determine a reaction endpoint. The reaction endpoint indicates the concentration of each chemical component such as the concentration of hydrochloric acid, sulfuric acid or sodium perchlorate. An example of a suitable thermometric titration includes, but is not limited to, the ASTM D664-11A test method.

The recovery solution can be treated so as to return the concentrations of at least a portion of the chemical components in the recovery solution to the initial component specification at process block 110. For instance, one or more adjustments solutions can be added to the recovery solution so as to generate an adjusted solution where the concentrations of measured chemical components approach the initial component specifications. The one or more adjustment solutions can be configured such that each adjustments solution includes a different one of the measured chemical components. As a result, the chemical components can be independently added to the recovery solution. Alternately, one or more adjustment solutions can include more than one of the chemical components that are added to the recovery solution.

Returning the recovery solution to the initial component specification can include one or more adjustment measurements where the concentrations of at least a portion of the chemical components in the recovery solution are measured. The portion of the chemical components that are measured during the adjustment measurements are the measured chemical components. The one or more adjustment solutions can be added to the recovery solution or the adjusted solution in response to the adjustment measurements. For instance, when the first adjustment measurement indicates that the concentration of a particular one of the chemical components in the recovered etchant is below the initial component specification for that chemical component, additional amounts of the identified chemical component can be added to the recovery solution by adding one or more of the adjustment solutions to the recovery solution. The addition of an adjustment solution to the recovery solution results in the formation of the adjustment solution. Additionally or alternately, when an adjustment measurement indicates that the concentration of a particular one of the chemical components (the identified chemical component) in the recovered etchant is above the initial component specification for the identified chemical component, additional amounts of one or more of the chemical components that are not the identified chemical component can be added to the recovery solution so as to reduce the concentration of the identified chemical component in the resulting adjusted solution. After adding additional amount(s) of one or more chemical components to the recovery solution, the process of sampling the recovery solution, performing an adjustment measurement, and adding chemical component to the resulting adjusted solution can be repeated until an adjustment measurement indicates that each of the measured chemical components falls within the initial component specification. As a result, the process of returning the recovery solution to the initial component specification can include generating a series of adjusted solutions. An adjusted solution having each of the measured chemical components fall within the initial component specification can serve as the recovered etchant. Suitable methods for the adjustment measurements include, but are not limited to, titration. In some instances, the titration is thermometric titration.

The inventors have surprisingly found that one or more of the chemical components in the etching solution need not be quantified in order to return the recovery solution to the initial component specification. As a result, the adjustment measurements need not quantify the amount of the one or more excluded chemical components called the unmeasured chemical components. As an example, when the etching solution includes hydrochloric acid, sulfuric acid, sodium perchlorate, and potassium perfluorobutane sulfonic acid (KFBS), the amount of KFBS in the recovery solution and/or recovered etchant need not be quantified by any of the measurements. In this example, the amount of KFBS is added to the recovery solution in proportion to the other components. For instance, the amount of KFBS is added to the recovery solution in an amount that would bring the level of KFBS in the total volume of the added solutions to the desired level and/or the level in the initial component specification.

When the first adjustment measurement taken on the recovery solution indicates that each of the measured chemical components falls within the initial component specification, the recovery solution can serve as the recovered etchant without adding any of the one or more adjustment solutions to the recovery solution.

Adding the one or more adjustment solutions to the recovery solution as described above causes the concentration of the measured chemical components in the adjusted solution(s) and in the resulting recovered etchant, to approach the concentration of the same chemical components in the etching solution. For instance, one, more than one, a portion, or all of the measured chemical component in the recovered etchant can each have a concentration that is within the concentration of that component in the etching solution+/− an adjustment factor where the adjustment factor is less than or equal to 2 wt % or 0.5 wt % of the concentration of that chemical component in the etching solution. In one example, the adjustment factor is 0.2 wt % of the concentration of the chemical components in the etching solution.

The recovered etchant can be mixed with the etching solution and the result used to etch other capacitor electrodes, can be stored, and/or used to etch other capacitor electrodes without being mixed with the etching solution. The method of FIG. 7 has been shown to result in more than more than 30 wt %, 50 wt % and less than 60 wt %, or 80 wt % of the chemical components that was included in the etching solution being included in the recovered etchant. In view of these results, a first etching solution can be used to etch a first sheet of material so as to generate a spent etchant as described above. At least one chemical component can be recovered from the spent etchant. A second etching solution that includes at least one of the recovered chemical components can then be used to etch a second sheet of material as described above. Capacitors can be fabricated with electrodes that include the etched first sheet of material second sheet and/or the etched second sheet of material.

Figure 8:
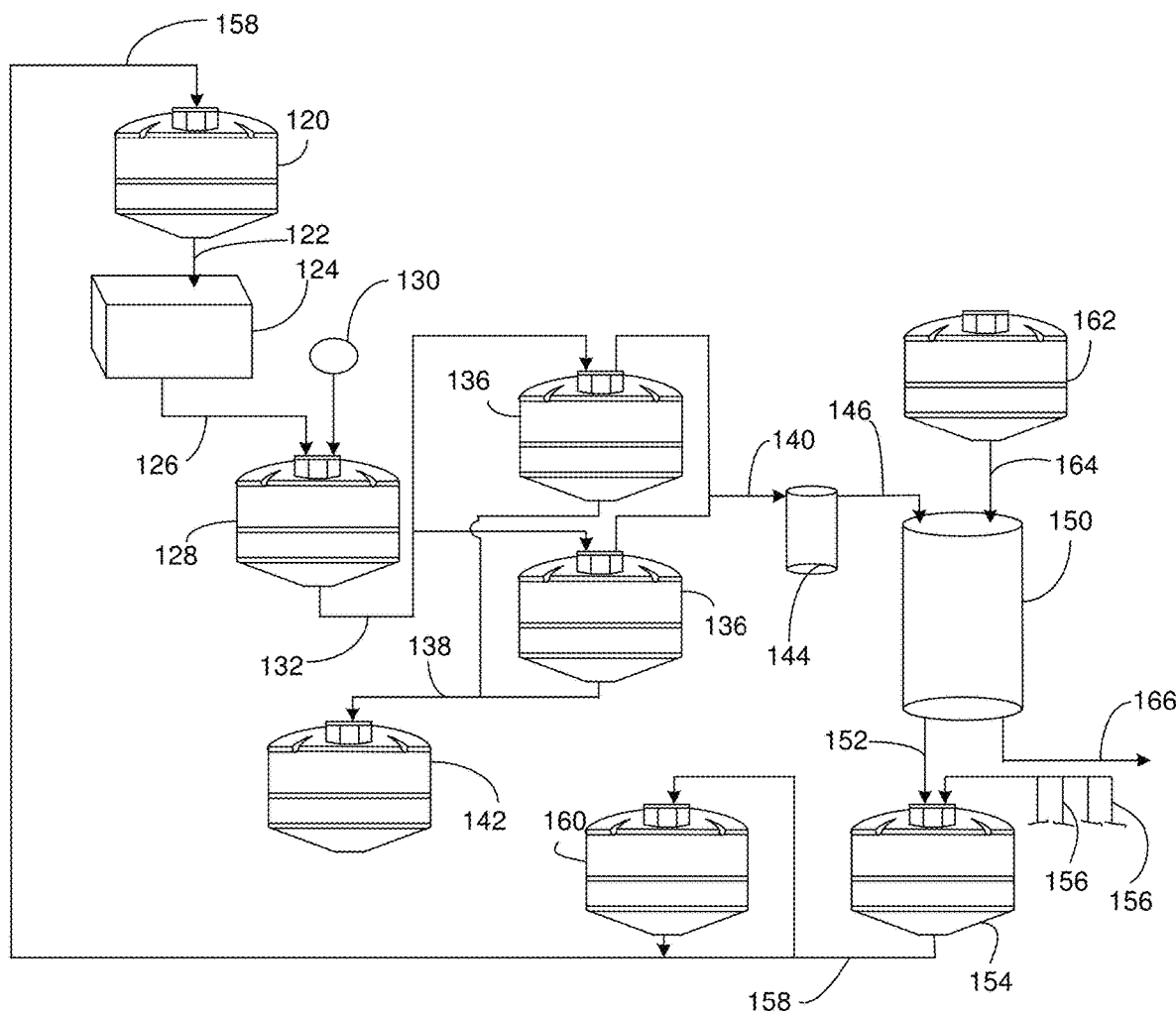
FIG. 8 illustrates a system that is suitable for recovering one or more chemicals from spent etching solution.

FIG. 8 illustrates a system that is suitable for recovering one or more chemicals from spent etching solution. The system includes an etchant reservoir 120 that holds the etchant 122. Suitable reservoirs include, but are not limited to, a tank. The etchant is transported from the etchant reservoir to a bath reservoir 124 that holds the bath of the etching solution where the preliminary channels are etched in the sheet of material (not shown). The spent etchant 126 is generated from etching the preliminary channels in the sheet of material.

The spent etchant 126 is transported from the bath reservoir to a mixing reservoir 128 along with a precipitant 130. The mixing reservoir 128 is configured to provide mechanical mixing of the precipitant 130 and the spent etchant 126 so as to form a precipitation solution 132. Suitable mixing reservoirs include, but are not limited to, tanks. In some instances, a suitable mixing tank is configured to remove a portion of the tank contents from at or near the bottom of the mixing tank and then return the removed portion to the mixing tank contents at another location. The precipitation solution 132 is transported from the mixing reservoir 128 to a settling reservoir 136 where the precipitate 138 is settled from the supernate 140. Suitable settling reservoirs include, but are not limited to, tanks.

In some instances, the system includes multiple settling reservoirs 136 because the settling period can be substantially larger than the mixing period. For instance, when precipitation solutions are mixed at different times, it is possible that different mixed precipitation solutions are being settled concurrently. The presence of multiple settling reservoirs allows different precipitation solutions to be transported into different settling reservoirs. This arrangement can result in different settling reservoirs concurrently holding precipitation solutions that were prepared at different times.

The system can optionally include a waste storage vessel 142. The precipitate from the settling reservoirs can be transported to the waste storage vessel 142 for later treatment and/or disposal at a non-hazardous waste landfill.

As noted above, during or after settling, one or more metal ion tests can optionally be performed on a sample of the supernate so as to determine if the metal ions have been removed from the supernate. A sample of the supernate for testing can be accessed from one or more of the settling reservoirs. When the one or more metal ion tests indicate that the concentration of the metal ion in the supernate is below an upper concentration threshold, the supernate 140 is transported from the one or more settling reservoirs 136 to the one or more refining components 144. Examples of suitable refining components 144 include, but are not limited to, filtration systems. Suitable filtration systems include, but are not limited to, filter arrays.

The system includes one or more precipitant cation removal components 150. The refined supernate 146 is transported from the one or more refining components 144 to the one or more precipitant cation removal components 150. The precipitant cation removal components 150 are each configured to remove the precipitant cation from the refined supernate so as to generate a recovery solution 152. Suitable precipitant cation removal components include, but are not limited to, ion exchange systems.

The system can include one or more adjustment reservoirs 154. The recovery solution 152 is transported from the one or more precipitant cation removal components 150 to the one or more adjustment reservoirs 154. One or more adjustments solutions 156 are added to the recovery solution 152 held by the one or more adjustment reservoirs 154 so as to generate a recovered etchant 158 having chemical component concentrations adjusted to the initial component specifications. Suitable adjustment reservoirs 154 include, but are not limited to, tanks.

As noted above, the one or more adjustment solutions 156 can be added to the recovery solution in response to measurements where the concentration of one or more chemical components in the recovery solution and/or in the recovered etchant are measured. A sample(s) of the recovery solution 152 and/or the recovered etchant 158 for measuring the component concentration(s) can be accessed from a sample valve in a recirculation loop in adjustment reservoirs 154.

The system can optionally include one or more storage reservoirs 160. The recovered etchant 158 can be transported from the one or more adjustment reservoirs 154 to the one or more storage reservoirs 160 where the recovered etchant can be stored. Suitable storage reservoirs 160 include, but are not limited to, tanks. In addition or as an alternative to storing the recovered etchant in the one or more storage reservoirs, the recovered etchant 158 can be transported from the one or more storage reservoirs 160 and/or from the one or more adjustment reservoirs 154 to the etchant reservoir 120. Accordingly, the recovered etchant 158 can be mixed with fresh etchant.

When the one or more precipitant cation removal components 150 include an ion exchange system, the system can optionally include a regeneration reservoir 162 where the regeneration solution 164 is stored. After using the ion exchange system to remove precipitant cation from the refined supernate, the regeneration solution can be flowed through the ion exchange resin so as to prepare the ion exchange resin for removal of the precipitant cation from another refined supernate. The regeneration solution that exits from the ion exchange system serves as spent regeneration solution 166. As noted above, in some instances, the spent regeneration solution 166 can be analyzed one or more times to determine when the regeneration process is complete. The spent regeneration solution can be neutralized and/or transported from the one or more precipitant cation removal components to a wastewater system.

The above system discloses solutions being transported from one component to another. The various components included in the system can optionally be in liquid communication with one another. As a result, all or a portion of the disclosed transportations can be done by way of pipes and conduits. The transportation through these mechanisms can be driven by the use of pumps, gravity, and valves.

Example 1

Preliminary channels were electrochemically etched into an aluminum sheet of material using an etchant that included 0.70 wt % hydrochloric acid, 0.91 wt % sulfuric acid, 3.8 wt % sodium perchlorate, and 60 ppm potassium perfluorobutane sulfonic acid (KFBS). Forming the preliminary channels resulted in spent etchant with a pH of 0.5.

2170 gallons of the spent etchant was transported into a mixing reservoir along with 530 gallons of treated etchant sent as purge solution and 46 gallons of NaOH so as to form a precipitation solution that was mixed for 22.5 hours. The resulting precipitation solution was transported to a settling reservoir where the precipitation solution remained for 4 days and 19.5 hours. During settling, a precipitate that included $Al(OH)_3$ and a supernate formed in the mixing reservoir at a volume ratio of about 1:3.

A sample of the supernate was decanted by 0.45 micron single-use filtering apparatus. A metal ion test performed on the refined supernate showed a concentration of aluminum ions of 0.012 mg/L, which was below the upper concentration threshold of 0.5 mg/L.

The supernate was decanted by inline filtration. The decanted supernate was filtered using a pleated polypropylene filter cartridge with a pore size of 0.5 micron to generate a refined supernate.

A cation exchange system was used to replace the sodium cations in the refined supernate with hydrogen cations ($H^+$). The cation exchange system included a bed of a cation exchange resin that was Amberlite FPC23 H. The cation exchange system had a downward flow design and the refined supernate was flowed through the bed of a cation exchange resin at a rate of 17 gallons per minute. The recovery solution output from the cation exchanger was sampled at a period of 1350 gallons and the samples analyzed by thermometric titration. The titration showed that the recovery solution included 0.64 wt % hydrochloric acid, 0.94 wt % sulfuric acid, 3.8 wt % sodium perchlorate.

The precipitate sludge was transported from the settling tank to a waste storage vessel for later disposal at a non-hazardous waste landfill.

After outputting the recovery solution, the refined supernate that remained in the bed of cation exchange resin was pushed back to the mixing reservoir at the beginning of the process using city water at approximately 20 gallons per minute. The bed of cation exchange resin was fluidized by city water. Regeneration of the cation exchange resin was performed in two stages in order to prepare the bed for the next refined supernate. First, a regeneration solution of 5.3 wt % Sulfuric Acid was downward flowed through the bed of a cation exchange resin at a rate of 12 gallons per minute for 104 minutes. A second regeneration stage used 5.7 wt % Sulfuric Acid solution downward flow through half of the cation exchange resin at a rate of 14 gallons per minute for 80 minutes.

The recovery solution was sampled and an adjustment determination analysis performed on the sample using mass balance calculation. The adjustment determination analysis showed that the theoretical recovery solution was 0.70 wt % hydrochloric acid, 0.91 wt % sulfuric acid, 3.75 wt % sodium perchlorate, and 60 ppm potassium perfluorobutane sulfonic acid (KFBS). In response, 12.6 liters of 32% hydrochloric acid, 5.6 liters of 60% sodium perchlorate, 39.6 gallons of city water and 3.9 liters of KFBS were added to the recovery solution. The recovery solution was sampled again and a second adjustment determination was not required. The adjustment measurement showed recovered etchant component ratios of 0.70 wt % hydrochloric acid, 0.91 wt % sulfuric acid, 3.8 wt % sodium perchlorate, and 60 ppm (KFBS). Since these recovered etchant component ratios fell within the initial component specification, the result was treated as recovered etchant.

The recovered etchant included 91 wt % of the hydrochloric acid that was originally present in the etching solution, 100 wt % of the sulfuric acid that was originally present in the etching solution, 100 wt % of the sodium perchlorate that was originally present in the etching solution, and 100 wt % of the potassium perfluorobutane sulfonic acid (KFBS) that was originally present in the etching solution.

The recovered etchant was used as an etching solution to etch channels in an aluminum foil that served as the sheet of material disclosed above. The conditions under where the channels were etched in the aluminum foil were 120 seconds etch with 7 minutes of widening. The etched aluminum foil was then formed. Anodes were cut from the result and an electrolytic capacitor constructed with a volume of 8 cc. The electrolytic capacitor was tested and showed an energy density above 5.5 J/cc with the anodes each showing a capacitance above 1.25 microF/cm$^2$ at 490 Volts.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A capacitor, comprising:
an electrode having a first active region that includes tunnels extending into an electrode metal,
the electrode having a first inactive region that includes the electrode metal but does not include the tunnels extending into the electrode metal,
the first inactive region having a first shape that includes multiple first projections that each projects from a perimeter of a first semicircle
the electrode includes a second active region that includes tunnels extending into the electrode metal,
the electrode having a second inactive region that includes the electrode metal but does not include the tunnels extending into the electrode metal,
the second inactive region having a second shape that includes multiple second projections that each projects from a perimeter of a second semicircle,
a first side of the electrode being opposite from a second side of the electrode,
the first active region and the first inactive region being on the first side of the electrode and the second active region and the second inactive region being on the second side of the electrode, and
the first semicircle is aligned with the second semicircle but the first projections are not aligned with the second projections.

2. The capacitor of claim 1, wherein the first projections are periodically arranged on the first semicircle and each one of the first projections has a perimeter that contacts the first semicircle twice.

3. The capacitor of claim 1, wherein the first semicircle is aligned with the second semicircle in that a first line can extend through the center of the first semicircle and also through the center of the second semicircle, the first line being parallel to a second line that is perpendicular to the first side of the electrode.

4. The capacitor of claim 1, wherein at least one first projection corresponds to one of the second projections in that the at least one first projection and the corresponding second projection has the same shape.

5. The capacitor of claim 1, wherein one of the second projections corresponds to one of the first projections and extends from the second semicircle over a first angular range, wherein
the corresponding first projection extends from the first semicircle over a second angular range, wherein
an absolute value of the first angular range is the same as an absolute value of the second angular range, and wherein
angles included in the second angular range are shifted relative to angles included in the first angular range by plus or minus one half of the absolute value of the first angular range.

6. The capacitor of claim 1, wherein the first semicircle and the second semicircle have the same radius of curvature.

7. A capacitor electrode precursor, comprising:
a sheet of material having a first active region that includes tunnels extending into an electrode metal,
the sheet of material having a first inactive region that includes the electrode metal but does not include the tunnels extending into the electrode metal,
the first inactive region having a first shape that includes multiple first projections that each projects from a perimeter of a first circle
the sheet of material includes a second active region that includes tunnels extending into the electrode metal,
the sheet of material having a second inactive region that includes the electrode metal but does not include the tunnels extending into the electrode metal,
the second inactive region having a second shape that includes multiple second projections that each projects from a perimeter of a second circle,
a first side of the sheet of material being opposite from a second side of the electrode,
the first active region and the first inactive region being on the first side of the sheet of material and the second active region and the second inactive region being on the second side of the sheet of material, and
the first circle is aligned with the second circle but the first projections are not aligned with the second projections.

8. The precursor of claim 7, wherein the first projections are periodically arranged on the first circle.

9. The precursor of claim 7, wherein each one of the first projections has a perimeter that contacts the first circle twice.

10. The precursor of claim 7, wherein the first circle is aligned with the second circle in that a first line can extend through the center of the first circle and also through the center of the second circle, the first line being parallel to a second line that is perpendicular to the first side of the sheet of material.

11. The precursor of claim 7, wherein the first circle is aligned with the second circle but the first projections are not aligned with the second projections.

12. The precursor of claim 7, wherein at least one first projection corresponds to one of the second projections in that the first projection and the corresponding second projection has the same shape.

13. The precursor of claim 7, wherein one of the second projections corresponds to one of the first projections and extends from the second circle over a first angular range, and
the corresponding first projection extends from the first circle over a second angular range,
an absolute value of the first angular range is the same as an absolute value of the second angular range, and
the angles included in the second angular range are shifted relative to the angles included in the first angular range by plus or minus one half of the absolute value of the first angular range.

14. The precursor of claim 7, wherein the first circle and the second circle have the same radius of curvature.

* * * * *